(12) United States Patent
Boehm et al.

(10) Patent No.: US 11,866,127 B2
(45) Date of Patent: Jan. 9, 2024

(54) ELECTROMECHANICAL REAR DERAILLEUR FOR COAXIAL MOUNTING

(71) Applicant: SRAM DEUTSCHLAND GmbH, Schweinfurt (DE)

(72) Inventors: Robert Boehm, Schonungen (DE); Sebastian Dueweling, Isny (DE)

(73) Assignee: SRAM DEUTSCHLAND GmbH, Schweinfurt (DE)

( * ) Notice: Subject to any disclaimer, the term of this patent is extended or adjusted under 35 U.S.C. 154(b) by 364 days.

(21) Appl. No.: 16/856,625

(22) Filed: Apr. 23, 2020

(65) Prior Publication Data
US 2020/0339220 A1    Oct. 29, 2020

(30) Foreign Application Priority Data

Apr. 25, 2019   (DE) ................ 10 2019 002 956.9
Feb. 10, 2020   (DE) ................ 10 2020 000 827.5

(51) Int. Cl.
  *B62M 9/122*  (2010.01)
  *B62M 9/125*  (2010.01)
  *B62M 9/00*   (2006.01)
  *B62M 9/124*  (2010.01)

(52) U.S. Cl.
  CPC ............ *B62M 9/122* (2013.01); *B62M 9/125* (2013.01); *B62M 2009/007* (2013.01); *B62M 2009/12406* (2013.01)

(58) Field of Classification Search
  CPC ...... B62M 9/125; B62M 9/122; B62M 9/121; B62M 9/1244; B62M 9/1242; B62M 2009/007; B62M 2009/12406

USPC .................................................... 474/80, 82
  See application file for complete search history.

(56) References Cited

U.S. PATENT DOCUMENTS

| | | | | |
|---|---|---|---|---|
| 3,111,855 A | * | 11/1963 | Hippolyte | B62M 9/126 474/82 |
| 3,903,751 A | * | 9/1975 | Dian | B62M 9/1244 474/82 |
| 3,927,904 A | * | 12/1975 | Bergles | B62M 9/1242 474/82 |
| 3,979,962 A | * | 9/1976 | Kebsch | B62M 9/1242 474/82 |
| 4,061,048 A | * | 12/1977 | Huret | B62M 9/126 474/82 |

(Continued)

FOREIGN PATENT DOCUMENTS

| CN | 1165766 C | 9/2004 |
|---|---|---|
| CN | 108622302 | 10/2018 |

(Continued)

*Primary Examiner* — Henry Y Liu

(57) ABSTRACT

The disclosure describes an electromechanical rear derailleur for coaxial mounting on a rear wheel axis. The rear derailleur has a base member, a pivot mechanism, a movable member having a chain guiding arrangement, and an electromechanical drive for driving the pivot mechanism. The pivot mechanism connects the base member to the movable member. The chain guiding arrangement is connected to the movable member for rotation about an axis of rotation. The base member comprises a first connection end, which can be mounted coaxially with the rear wheel axis, and a second connection end for coupling with the pivot mechanism.

16 Claims, 25 Drawing Sheets

(56) References Cited

U.S. PATENT DOCUMENTS

| | | | | |
|---|---|---|---|---|
| 4,185,510 A * | 1/1980 | Juy | B62M 9/1244 | 280/238 |
| 4,504,250 A * | 3/1985 | Juy | B62M 9/1244 | 474/78 |
| 4,734,084 A * | 3/1988 | Nagano | B62M 9/125 | 474/82 |
| 4,789,379 A * | 12/1988 | Ozaki | B62M 9/1248 | 474/82 |
| 4,842,568 A * | 6/1989 | Marchigiano | B62M 9/125 | 474/80 |
| 5,397,273 A * | 3/1995 | Ando | B62M 9/1248 | 474/82 |
| 5,494,307 A * | 2/1996 | Anderson | B62M 9/122 | 280/236 |
| 5,518,456 A * | 5/1996 | Kojima | B62M 9/1248 | 474/82 |
| 5,597,366 A * | 1/1997 | Ozaki | B62M 9/1248 | 474/82 |
| 5,624,335 A * | 4/1997 | Ando | B62M 9/1244 | 474/80 |
| 5,919,106 A * | 7/1999 | Ichida | B62M 9/125 | 474/82 |
| 5,961,409 A * | 10/1999 | Ando | B62M 9/1244 | 474/82 |
| 6,162,140 A * | 12/2000 | Fukuda | B62M 25/08 | 474/81 |
| 6,293,883 B1 * | 9/2001 | Ichida | B62K 25/02 | 474/82 |
| 6,761,655 B2 * | 7/2004 | Fukuda | B62M 9/128 | 474/70 |
| 7,033,294 B2 * | 4/2006 | Chamberlain | B62J 13/00 | 474/80 |
| 7,044,874 B2 * | 5/2006 | Shahana | B62M 9/125 | 474/82 |
| 7,048,660 B2 * | 5/2006 | Shahana | B62M 9/125 | 474/80 |
| 7,125,354 B2 * | 10/2006 | Shahana | B62M 9/1242 | 474/82 |
| 7,152,498 B2 * | 12/2006 | Shahana | F16C 1/12 | 74/502.6 |
| 7,396,304 B2 * | 7/2008 | Shahana | B62M 9/125 | 474/82 |
| 7,703,785 B2 * | 4/2010 | Colegrove | B62K 25/286 | 474/122 |
| 8,419,573 B2 * | 4/2013 | Yamaguchi | B62M 9/127 | 267/155 |
| 9,676,444 B2 * | 6/2017 | Shipman | B62M 25/08 | |
| 10,011,325 B2 * | 7/2018 | Zawistowski | B62M 9/122 | |
| 10,793,222 B1 * | 10/2020 | Harris | B62M 9/1244 | |
| 2004/0106482 A1 * | 6/2004 | Nagano | B62M 9/1242 | 474/82 |
| 2004/0110586 A1 * | 6/2004 | Shahana | B62J 23/00 | 474/80 |
| 2004/0110587 A1 * | 6/2004 | Shahana | B62J 23/00 | 474/82 |
| 2004/0116222 A1 * | 6/2004 | Shahana | B62M 9/125 | 474/82 |
| 2004/0177713 A1 * | 9/2004 | Shahana | B62M 9/125 | 74/473.14 |
| 2004/0254038 A1 * | 12/2004 | Chamberlain | B62M 9/128 | 474/82 |
| 2005/0192138 A1 * | 9/2005 | Sze | B62M 9/126 | 474/83 |
| 2005/0215368 A1 * | 9/2005 | Hoe | B62M 9/126 | 474/80 |
| 2005/0239587 A1 | 10/2005 | Ichida et al. | | |
| 2006/0172831 A1 * | 8/2006 | Wen | B62M 9/128 | 474/82 |
| 2007/0021248 A1 * | 1/2007 | Shahana | B62M 9/16 | 474/83 |
| 2007/0026985 A1 * | 2/2007 | Yamaguchi | B62M 9/126 | 474/82 |
| 2009/0045601 A1 * | 2/2009 | Colegrove | B62M 9/125 | 280/284 |
| 2010/0160099 A1 * | 6/2010 | Colegrove | B62M 9/125 | 474/122 |
| 2015/0111675 A1 * | 4/2015 | Shipman | B62M 9/122 | 474/82 |
| 2016/0039494 A1 * | 2/2016 | Mikesell | B62K 3/02 | 474/82 |
| 2016/0167740 A1 * | 6/2016 | Zawistowski | B62M 9/1342 | 474/122 |
| 2018/0022417 A1 * | 1/2018 | Bernardele | B62M 9/1244 | 474/122 |
| 2018/0065708 A1 * | 3/2018 | Shipman | B62M 9/122 | |
| 2018/0237104 A1 * | 8/2018 | Pasqua | B62M 9/125 | |
| 2018/0265169 A1 * | 9/2018 | Braedt | B62M 9/125 | |
| 2018/0354586 A1 * | 12/2018 | Komatsu | B62M 9/1242 | |
| 2019/0144071 A1 * | 5/2019 | Boehm | B62M 9/1242 | 474/80 |
| 2019/0351971 A1 * | 11/2019 | Dueweling | B62M 9/122 | |

FOREIGN PATENT DOCUMENTS

| | | |
|---|---|---|
| DE | 102018001253 | 9/2018 |
| EP | 1010612 | 6/2000 |
| EP | 1342658 P | 9/2003 |
| EP | 0875444 | 12/2003 |
| EP | 1764297 | 10/2008 |
| EP | 3388324 | 10/2018 |
| TW | I574881 | 3/2017 |

* cited by examiner

ELECTROMECHANICAL REAR DERAILLEUR FOR COAXIAL MOUNTING

PRIORITY

This application claims priority to, and/or the benefit of, German patent application DE 10 2019 002 956.9, filed on Apr. 25, 2019, and German patent application DE 10 2020 000 827.5, filed on Feb. 10, 2020, the contents of which are included by reference herein in their entirety.

BACKGROUND

The disclosure relates to an electromechanical rear derailleur for coaxial mounting on a rear wheel axis.

Rear derailleurs are conventionally fastened to the right dropout of the frame by a derailleur hanger. For this purpose, the derailleur hanger is fixed to the frame at one end coaxially with the rear wheel axis and is connected at another end coaxially with the B-axis of the base member (B-knuckle) of the rear derailleur. The distance between the geometric axis A of the rear wheel axle and the B-axis of the base member is bridged by the derailleur hanger. In the state mounted on the frame, the base member is rotatable relative to the derailleur hanger about the B-axis. The rotation of the rear derailleur forwards—counter-clockwise (CCW)—is limited by the B-screws. The rotation of the rear derailleur clockwise (CW) is countered by the chain tension.

Derailleur hangers differ greatly from one another depending on the manufacturer and the method of attachment. They can be formed in one piece with the frame or be in the form of a separate component. Separate derailleur hangers are clamped to the frame either via quick release pins or linchpins. Clamping on both the frame outer side and the frame inner side is possible. This has the result that the rear derailleur assumes a different position relative to the rear wheel axis and the sprocket cluster, according to the derailleur hanger used. These differences in position in the axial and the radial direction make the design of the rear derailleur and the mounting thereof complicated. The rear derailleur must be re-adjusted according to the derailleur hanger. Because of the additional component, there are additional tolerances, which adversely affect the positioning accuracy of the rear derailleur.

In addition, derailleur hangers, especially as separate components, are susceptible to damage and may be unstable. In the case of large sprocket clusters and correspondingly large rear derailleur dimensions, increased leverage forces occur, which can be absorbed unsatisfactorily by the derailleur hanger. Moreover, the increased rear derailleur dimensions with the lengthened leverage ratios additionally adversely affect the positioning accuracy of the rear derailleur. This conflicts with the fact that an increased number of sprockets arranged close together specifically require increased positioning accuracy.

Mechanical rear derailleurs for coaxial mounting on the rear wheel axis are known from EP 0 875 444 A1, EP 1 342 658 A1 and EP 1 764 297 A1. The separate derailleur hanger is unnecessary, the B-axis of the base member runs along the rear wheel axis A, coaxially.

A disadvantage of the known rear derailleurs is the lack of stability of the arrangement and the associated lack of precision. Modern bicycle drives increasingly have an electronically controlled rear derailleur and a sprocket cluster with an increased number of eleven, twelve or thirteen sprockets and in some cases large tooth jumps between the adjacent sprockets. These sprocket clusters have a gear ratio spread of 500 percent or more. Such gear ratio spreads can be achieved with a smallest sprocket with 9, 10 or 11 teeth and a largest sprocket with 50, 51, 52 teeth or more. In order to be able to operate the increased number of sprockets with the rear derailleur, the dimension of the rear derailleur is increased. This is accompanied by an increase in the lever forces acting on the rear derailleur, so that the rear derailleur tends to tilt relative to the rotational planes of the sprockets. Only a rear derailleur that is located exactly vertically beneath the sprocket cluster can be shifted precisely.

A further disadvantage is the dependence on frame tolerances. Because conventional rear derailleurs are fastened directly to the frame and are referenced relative thereto, manufacturing tolerances of the frame also directly affect the rear derailleur. The positioning accuracy and the adjustability of the rear derailleur suffer as a result.

Slanting pivot mechanisms (slant parallelogram) impacts in the vertical direction, as may occur when travelling on open terrain, and can lead to a movement of the pivot mechanism (and thus to ghost shifting). In order to be able to approach the very different sized sprockets, the slant parallelogram may have to slant even more and/or the dimensions of the rear derailleur may have to be increased further. Both may further increase the susceptibility to ghost shifting.

In electromechanically operated rear derailleurs specifically, the object is to overcome the mentioned disadvantages. This object is achieved by an electromechanical rear derailleur according to the present disclosure.

SUMMARY

According to one aspect, an electromechanical rear derailleur for coaxial mounting on a rear wheel axis includes a base member, a moveable member, a chain guide arrangement, a pivot mechanism, and an electromechanical drive for driving the pivot mechanism. The base member is releasably mounted on a bicycle frame. The chain guiding arrangement is connected to the movable member for rotation about an axis of rotation P. The pivot mechanism connects the base member to the movable member such that the movable member is movable relative to the base member. The base member includes a first connection end and a second connection end, the first connection end for coaxial mounting on the rear wheel axis (A), and the second connection end for coupling with the pivot mechanism.

BRIEF DESCRIPTION OF DRAWINGS

FIG. 11b is a perspective view of the third embodiment of FIG. 11a;

Other aspects and advantages of the embodiments disclosed herein will become apparent upon consideration of the following detailed description, wherein similar or identical structures have similar reference numerals.

DETAILED DESCRIPTION

Figure 1:
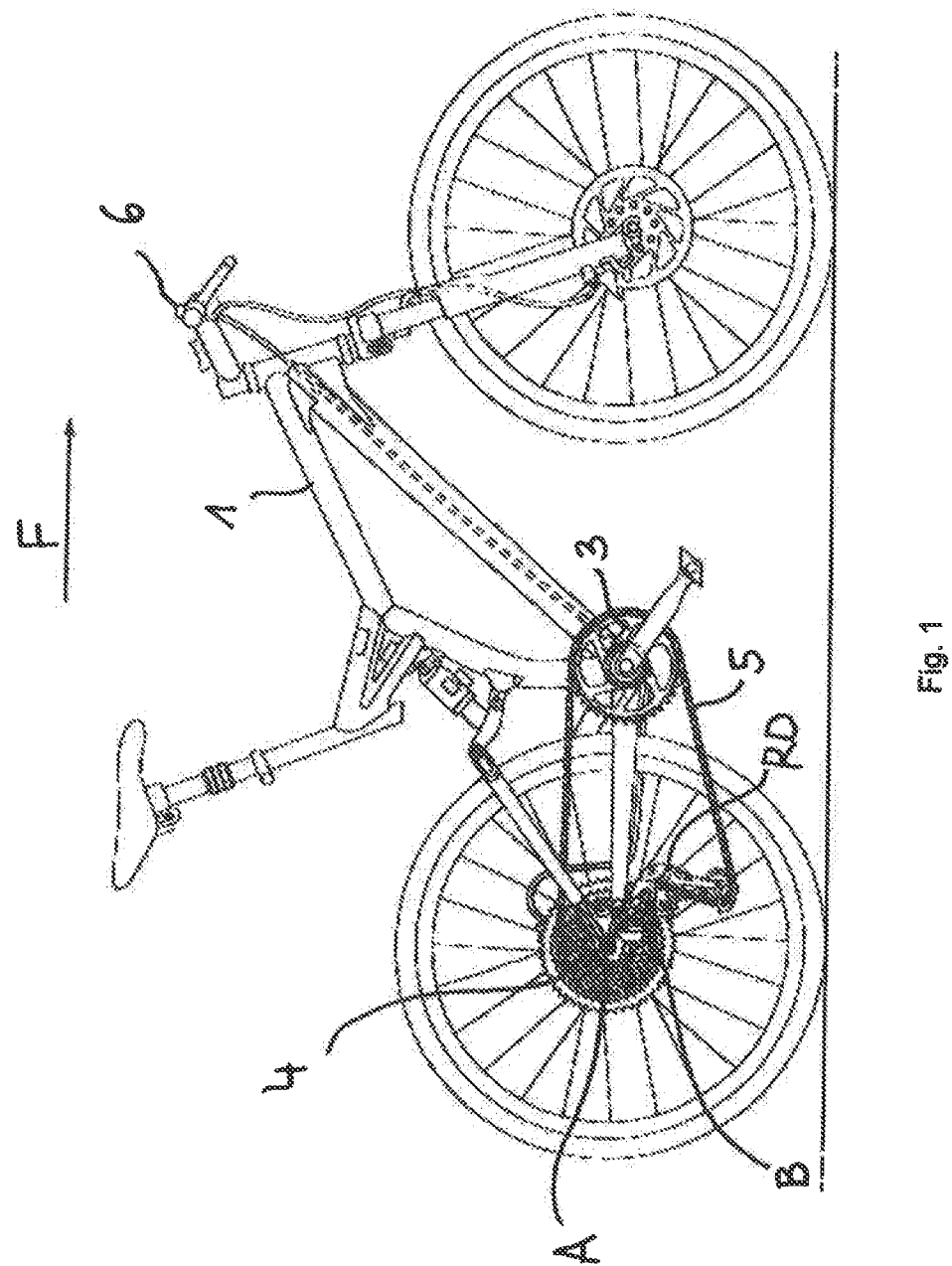
FIG. 1 is an electromechanical rear derailleur mounted on a bicycle according to one embodiment.

An electromechanical rear derailleur is suitable for coaxial mounting on a rear wheel axis A. The rear derailleur comprises a base member (B-knuckle), a movable member (P-knuckle), a chain guiding arrangement, a pivot mechanism and an electromechanical drive. The base member is configured for releasable mounting on the bicycle frame. The base member, in the ready-to-use state, is fixed relative to the bicycle frame in a rotationally secure manner about the B-axis. The chain guiding arrangement is connected to the movable member for rotation about an axis of rotation P (P-axis). The pivot mechanism connects the base member to the movable member, so that the movable member is movable relative to the base member. The electromechanical drive is configured to drive the pivot mechanism. The base member comprises a first connection end, which can be mounted along a mounting axis (which corresponds to the B-axis or the Z-axis) coaxially with the rear wheel axis A, and a second connection end for coupling with the pivot mechanism. In the mounted state, the mounting axis of the base member (B-axis or Z-axis) runs coaxially with the rear wheel axis A.

According to one embodiment of the rear derailleur, the first connection end of the base member is connected to the base member in a rotationally secure manner. The first connection end is formed in one piece with the base member.

Attachments of the rear derailleur such as a derailleur hanger permit a rotational movement of the base member relative to the derailleur hanger about the B-axis.

According to one embodiment, the base member is formed in one piece with its first connection end and its second connection end.

According to one embodiment of the rear derailleur, the first connection end has at least one arm with a centring opening. The Z-axis, which corresponds to the B-axis of the rear derailleur, runs through the mid-point of the centring opening. In the mounted state, the Z-axis, the B-axis and the rear wheel axis A run coaxially.

The first connection end of the base member has a first arm and a second arm. The first and the second arm are arranged spaced apart from one another in the axial direction. The first arm has a first centring opening and the second arm has a second centring opening. The mid-points of the two centring openings lie on the same axis Z.

The two arms serve to fasten the base member to the frame. It is advantageous in this embodiment that the two spaced apart arms of the base member, in the mounted state, ensure stable orientation of the rear derailleur parallel to the rotational plane of the sprockets and thus perpendicular to the rear wheel axis A. Tilting of the rear derailleur out of this plane is prevented effectively even in the case of relatively large forces. The two axially spaced apart fastening points of the base member on the rear wheel axis are significantly better able to absorb the forces acting on the rear derailleur than rear derailleurs with only one fastening point.

According to one embodiment, in the mounted state, the first arm of the rear derailleur is located on an axial inner side of the bicycle frame and the second arm is located on an axial outer side of the frame.

Inner side of the frame means the side of the frame facing in the direction towards the sprocket cluster. The axial outer side is the side of the frame, opposite the inner side, facing away from the sprocket cluster.

According to one embodiment of the rear derailleur, the second connection end of the base member has a first pin receiver for a first pivot pin of the pivot mechanism and a second pin receiver for a second pivot pin of the pivot mechanism.

Via the first pivot pin, the inner pivot arm of the pivot mechanism is rotatably connected to the base member. Via the second pivot pin, the outer pivot arm of the pivot mechanism is rotatably connected to the base member. For this purpose, the pivot pins are each mounted in a pin receiver on the base member. The second connection end of the base member faces in the direction towards the pivot mechanism.

The pin receivers on the base member are so oriented that they are able to receive the pivot pins oriented orthogonally to the rear wheel axis A. That is to say, the pin receivers, or the longitudinal axes thereof, are matched to the pivot pins of the pivot mechanism and, exactly like the pivot pins, are each oriented orthogonally to the rear wheel axis A. In other words, the longitudinal axes of the first and second pin receivers of the base member each lie in a plane which runs parallel to the rotational plane of the sprockets and thus also intersects the rear wheel axis A at a right angle. Deviations of up to about plus or minus 5 degrees fall within the range of "substantially orthogonally". This orientation of the pin receivers on the base member permits coupling with a straight pivot mechanism (straight parallelogram four-bar linkage).

All four pivot pins of the pivot mechanism are oriented orthogonally to the rear wheel axis A.

Because the pivot pins are oriented orthogonally to the rear wheel axis A, the pivot mechanism moves only in the axial direction (horizontally). Vibrations or impacts in the vertical direction, as occur when travelling over uneven terrain, can be absorbed by the pivot mechanism without moving it. Ghost shifting is prevented. Moreover, a rear derailleur with a straight parallelogram four-bar linkage is particularly easy to mount and adjust.

According to one embodiment of the rear derailleur, the chain guiding arrangement comprises a top chain guiding roller. The chain guiding arrangement is connected to the movable member for rotation about the P-axis. The top chain guiding roller is rotatably arranged at a constant top distance from the axis of rotation P of the chain guiding arrangement. The rear derailleur further comprises a bottom chain guiding roller, which is rotatably arranged at a constant bottom distance from the axis of rotation P of the chain guiding arrangement. The axis of rotation of the top chain guiding roller is spaced apart from the P-axis. The top distance between the axis of rotation of the top chain guiding roller and the axis of rotation P of the chain guiding arrangement is shorter than the bottom distance between the axis of rotation of the bottom chain guiding roller and the axis of rotation P.

Alternatively, the pivot mechanism may be in the form of a slant parallelogram. The first and the second pin receivers of the base member are each oriented at an angle relative to the rear wheel axis A. The longitudinal axes of the pin receivers are at an angle relative to the rear wheel axis A, and do not run orthogonally thereto. Specifically, in the case of racing bicycles which are subjected to less strong impacts and mostly comprise sprocket clusters with a smaller spread, this embodiment would be conceivable despite the disadvantages mentioned above.

According to one embodiment, the rear derailleur has an adapter for connecting the base member to the frame. The adapter comprises a screw connection. The screw connection is formed by a bolt with an external thread and a nut with an internal thread. The bolt and the nut can be screwed into one another along the B-axis.

The adapter passes through the frame opening at the dropout and the centring openings of the base member. By tightening the screw connection, the adapter can be fixed relative to the frame both in the axial direction and rotationally. The bolt head of the bolt and the nut are larger than the frame opening and lie against the inner and outer side thereof. The nut has a knurled contact face which, in the finished mounted state, lies in a force- and form-fitting manner against the frame. A first outside diameter of the adapter is matched to an inside diameter of the first centring opening of the base member. And a second outside diameter of the adapter is matched to an inside diameter of the second centring opening of the base member.

In the ready-to-use state, the first arm of the base member is arranged between the hub end cap and the adapter. The first arm of the base member is fixed in a force-fit and rotationally secure manner between the hub end cap and the adapter. The force fit is produced by tightening the rear wheel axle, in particular the linchpin. The base member is thereby clamped between hub end cap and the adapter and at the same time oriented orthogonally to the hub axis. The usual referencing of the rear derailleur to the frame is omitted, so that manufacturing tolerances of the frame no longer adversely affect the positioning and adjustment of the rear derailleur. The base member is positioned relative to the frame with play, so that it is not in contact therewith. In the ready-to-use state, the rear derailleur and the rear wheel are fitted and the linchpin is tightened. The base member is then both fixed in the axial direction and mounted in a rotationally secure manner on the rear wheel axle. In addition, the base member surrounds the adapter and is centered relative thereto.

According to one embodiment of the rear derailleur, the electromechanical drive is arranged in the region of the base member.

According to one embodiment, the electromechanical drive is in the form of a worm gear. The motor-driven worm of the worm gear is arranged at least in part in the region of the base member. The worm cooperates with a worm wheel on the pivot mechanism. The worm wheel is formed on the outer pivot arm. Further gear stages may be provided between the worm and the worm wheel if required.

According to an alternative embodiment of the rear derailleur, the electromechanical drive may be arranged in the region of the movable member.

The electromechanical drive is in the form of a worm gear, and the motor-driven worm thereof is arranged at least in part in the region of the movable member. The worm thereby cooperates with a worm wheel on the pivot mechanism. The worm wheel is in the form of a segmented wheel on the outer pivot arm. Further gear stages may be provided between the worm and the worm wheel if required.

According to one embodiment, the electromechanical drive is received in a gear housing. The base member or the movable member defines a housing cavity in which the gear housing is arranged at least in part.

According to the positioning of the electrical drive, the size may be correspondingly adapted. The electrical drive, or the gear housing surrounding it, can protrude, if required, from the base member or the movable member into the cavity between the two pivot arms of the pivot mechanism.

The arrangement of the electronic drive in a gear housing permits a modular construction of the rear derailleur and simplifies the assembly thereof. The gear of the electrical drive can be handled and tested in the form of a pre-assembled module. If required, a damaged electrical drive can be replaced without the remaining members of the rear derailleur being affected.

The electromechanical drive generally comprises a motor, a gear with one or more gear stages, and an output shaft. The gear, which is connected to the motor shaft, can be in the form of, for example, a spur gear, a bevel gear, a worm gear, a crown gear or the like. Independently of the type of gear, the electrical drive can be arranged at different positions of the rear derailleur. The arrangement of the electrical drive in the region between the B-axis of the base member and the P-axis of the movable member is particularly suitable. Likewise independently of the type of gear, the electrical drive can be received in a gear housing or be fastened directly to the rear derailleur.

According to one embodiment, the base member is in multi-part form. The base member comprises at least a first base sub-member for mounting on a bicycle frame and a second base sub-member for mounting on the first base sub-member. The housing cavity is defined between the first and second base sub-member.

In the connected state of the first and the second base sub-member, the gear housing is fixed in a form- and/or force-fitting manner in the housing cavity.

For all the embodiments, the electrical drive, with or without a gear housing, is fixed relative to the rear derailleur. Specifically, the electrical drive is fixed relative to the base member or the movable member. Different conventional connecting techniques are conceivable.

According to one embodiment of the rear derailleur, the first base sub-member comprises the first connection end having the first arm and the second arm. The first base sub-member is formed in one piece with the first connection end, or the first and second arm.

According to one embodiment, the rear derailleur has a power source. The power source is releasably attached to the base member. A notional midplane extends through the power source centrally and from top to bottom and from the rear to the front. The power source is so connected to the base member that its midplane runs between the first arm and the second arm of the base member. The midplane of the battery runs in the axial direction between the sides of the first and second arm that face one another—namely between the first arm outer side of the first arm and the second arm inner side of the second arm. The arm inner side means in each case the side of the arms that faces in the direction towards the sprocket cluster in the mounted state of the base member. The arm outer side means in each case the side of the arms facing away from the sprocket cluster.

This arrangement of the battery gives rise to advantages when the rear derailleur is in the mounted state on the frame. A notional midplane can also be associated with the right dropout of the bicycle frame. In the mounted state of the rear derailleur, the midplane of the dropout runs between the first and the second arm of the base member, in particular between the first arm outer side of the first arm and the second arm inner side, facing it, of the second arm.

The midplane of the power source runs approximately in the region of the midplane of the dropout. The midplane of the power source may run further inwards in the axial direction than the midplane of the dropout. The power source is arranged approximately in a plane with the dropout. The power source is even arranged offset axially inwards in relation to the dropout.

The coaxial mounting of the rear derailleur allows the electromechanical drive and the power source to be arranged in a plane with the right dropout of the frame. The coaxial rear derailleur is thus arranged only slightly exposed relative to the frame. Sensitive parts, those of the electrical drive, are better protected. By comparison, non-coaxially mounted rear derailleurs are arranged further outwards in the axial direction relative to the frame. The electromechanical drive and power source thereof are thus more exposed in relation to the dropout and more susceptible to impacts and damage.

According to one embodiment, the electromechanical drive has an electrical interface with a power source. The gear housing of the drive has the electrical interface with a power source. The electrical interface is in the form of electrical contacts.

According to one embodiment of the rear derailleur, the base member is so configured that a power source is to be fastened to the base member in such a manner that the power source is electrically connected to the electromechanical drive. There is a direct electrical connection between the drive and the power source when the battery is arranged adjacent to the electromechanical drive.

Alternatively, the power source could be arranged spaced apart from the electrical drive. The electrical drive is then connected to the remotely positioned power source by an electric cable. The power source could be arranged on the rear derailleur spaced apart from the electrical drive or on the frame spaced apart from the rear derailleur.

In bicycles which are operated by an electric power system (E-bike), the rear derailleur could be supplied with power via an accumulator of the electric power system which is spaced apart from the rear derailleur. The rear derailleur is then connected to the accumulator of the E-bike drive via a cable.

The electromechanical rear derailleur can be used in a bicycle drive which comprises a multi-sprocket arrangement with eleven, twelve or more sprockets, a bicycle chain and a chainring arrangement with precisely one chainring. Alternatively, embodiments with multiple chainrings, which are shifted by an electrical front derailleur, are conceivable. Cable-free control of the rear derailleur and/or of the front derailleur is provided.

At least one sprocket of the multi-sprocket arrangement can have a sequence of a thin tooth, a thick tooth and a further thin tooth. A thick tooth is thereby configured to be so thick in the axial direction that it can engage in an outer link pair of the chain but not in an inner link pair. This has a positive effect on the guiding of the chain. The sequence can be repeated multiple times along the periphery of a sprocket. In the case of sprockets with an even number of teeth, all the teeth can also be configured to be alternately thin and thick. The axial thickening can be pronounced either on both sides of the sprocket or on only one side. Preferably, the thickening is arranged on only the rear side of the sprocket. It is of importance on the two largest sprockets because the skew of the chain is most pronounced there. The negative consequences of the chain skew are minimized by the improved guiding of the chain.

The front single chainring can also have alternate thick and thin teeth, which serve the purpose of improved chain guiding.

The embodiments are described in relation to the drawings. It will be appreciated that the drawings and descriptions set out are provided merely for illustration and do not limit the disclosure. For better understanding of the disclosure, the figures show different sub-assemblies or mounting stages of the embodiments of rear derailleur on different scales.

The directional terms "front/rear", "outer/inner", "top/bottom" and "left/right" used hereinbelow relate to a bicycle which is oriented and used as shown in FIG. 1 in the direction of travel F (direction of the arrow). The bicycle frame 1 has a left and a right rear dropout, between which the rear wheel is mounted. The rear wheel rotates together with the sprocket cluster 4 about the rear wheel axis A. The electromechanical rear derailleur RD is mounted on the right dropout 2. On shifting from a larger sprocket to a smaller sprocket, the rear derailleur RD moves the chain 5 outwards (outboard). On shifting from a smaller sprocket to a larger sprocket, the rear derailleur RD moves the chain 5 inwards (inboard). Axial relates to the rear wheel axis A, or the axis of rotation A of the multi-sprocket arrangement 4. The largest sprocket lies axially further inwards than the smaller sprockets. The teeth are arranged radially outwards on the sprockets.

The electromechanical rear derailleur RD is mounted on the right dropout 2 of the bicycle frame 1. In the case shown, the rear derailleur RD is mounted in the conventional manner by a derailleur hanger. For this purpose, the derailleur hanger is connected on the one hand to the rear wheel axle along the axis A and on the other hand to the base member of the rear derailleur along the B-axis. The B-axis of the base member is spaced apart from the rear wheel axis A. This distance is bridged by the derailleur hanger. The rear derailleur RD shown is thus mounted non-coaxially with the rear wheel axis A.

The bicycle drive shown in FIG. 1 comprises a front single chain wheel 3, a rear sprocket cluster 4 and a chain 5, which can be moved from one sprocket to the next by the rear derailleur RD. Shift signals are transmitted to the electromechanical rear derailleur RD from a shifter 6 mounted on the handle bar. The transmission of the shift signals from the shifter 6 to the rear derailleur RD takes place wirelessly. Transmission of the shift signals by a cable would likewise be conceivable.

FIGS. 2 to 7 show the first exemplary embodiment of the electromechanical rear derailleur in different views and mounting states.

FIGS. 2a, 2b, 2c and 2d are different views of a sub-assembly of the electromechanical rear derailleur 10, which is mounted on the right dropout 2 of the frame 1 coaxially with the rear wheel axis A. The electromechanical rear derailleur 10 comprises a base member 20, a movable member 40, which is movably connected to the base member 20 via a pivot mechanism 30, an electromechanical drive 80 and a chain guiding arrangement, which is not shown here for the sake of better clarity.

A chain guiding arrangement consists of a chain guiding cage and bottom and top chain guiding rollers rotatably mounted therein. The chain guiding arrangement is connected to the movable member 40 for rotation about an axis of rotation P. The axis of rotation of the top chain guiding roller is spaced apart from the P-axis of the movable member 40. Such a chain guiding arrangement 90 is shown by way of example in the embodiments in FIG. 8 and FIG. 10. This chain guiding arrangement 90 is also suitable for combination with the embodiment shown in FIGS. 1 to 7.

Figure 2A:
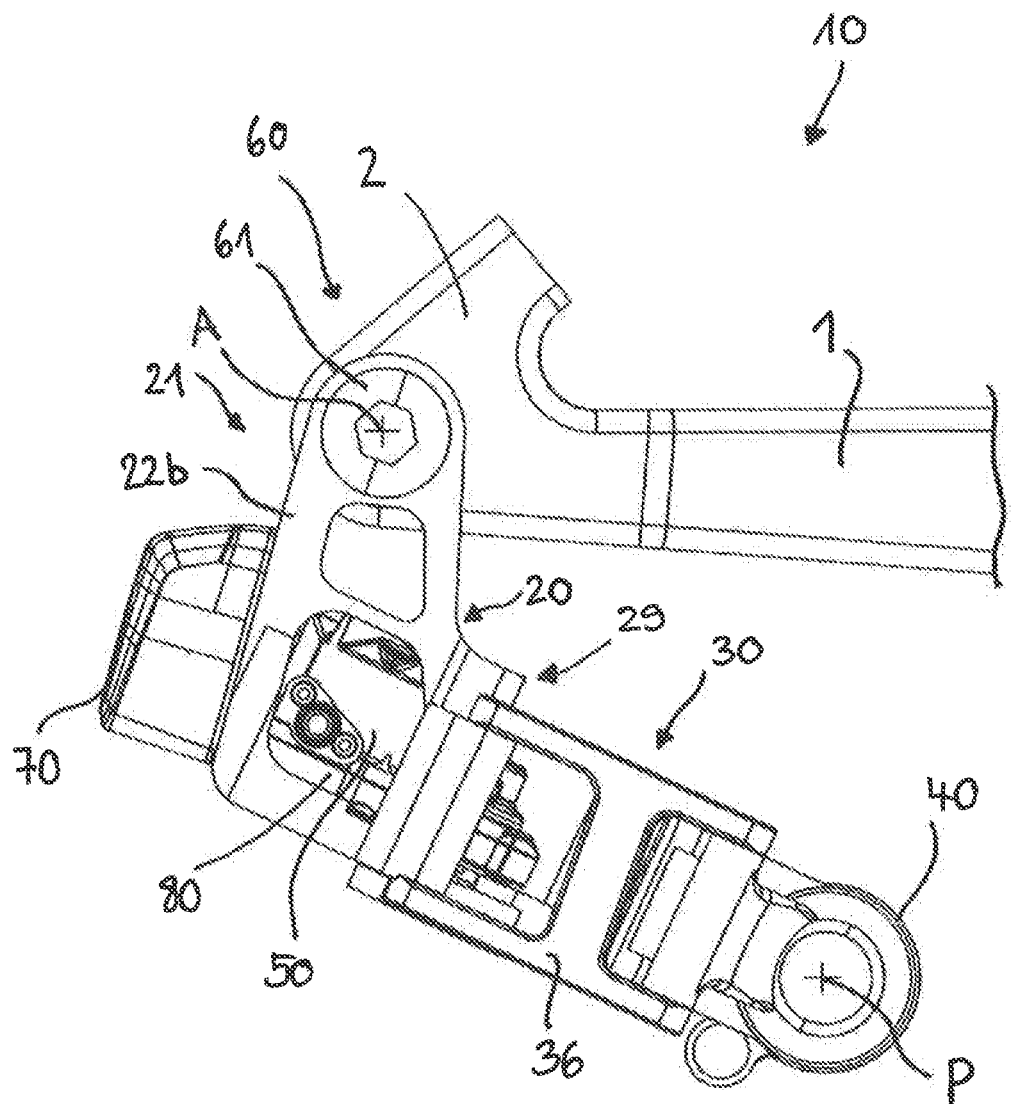
FIG. 2*a* is an exterior view of a sub-assembly of the rear derailleur mounted on the frame according to one embodiment.
Figure 2B:
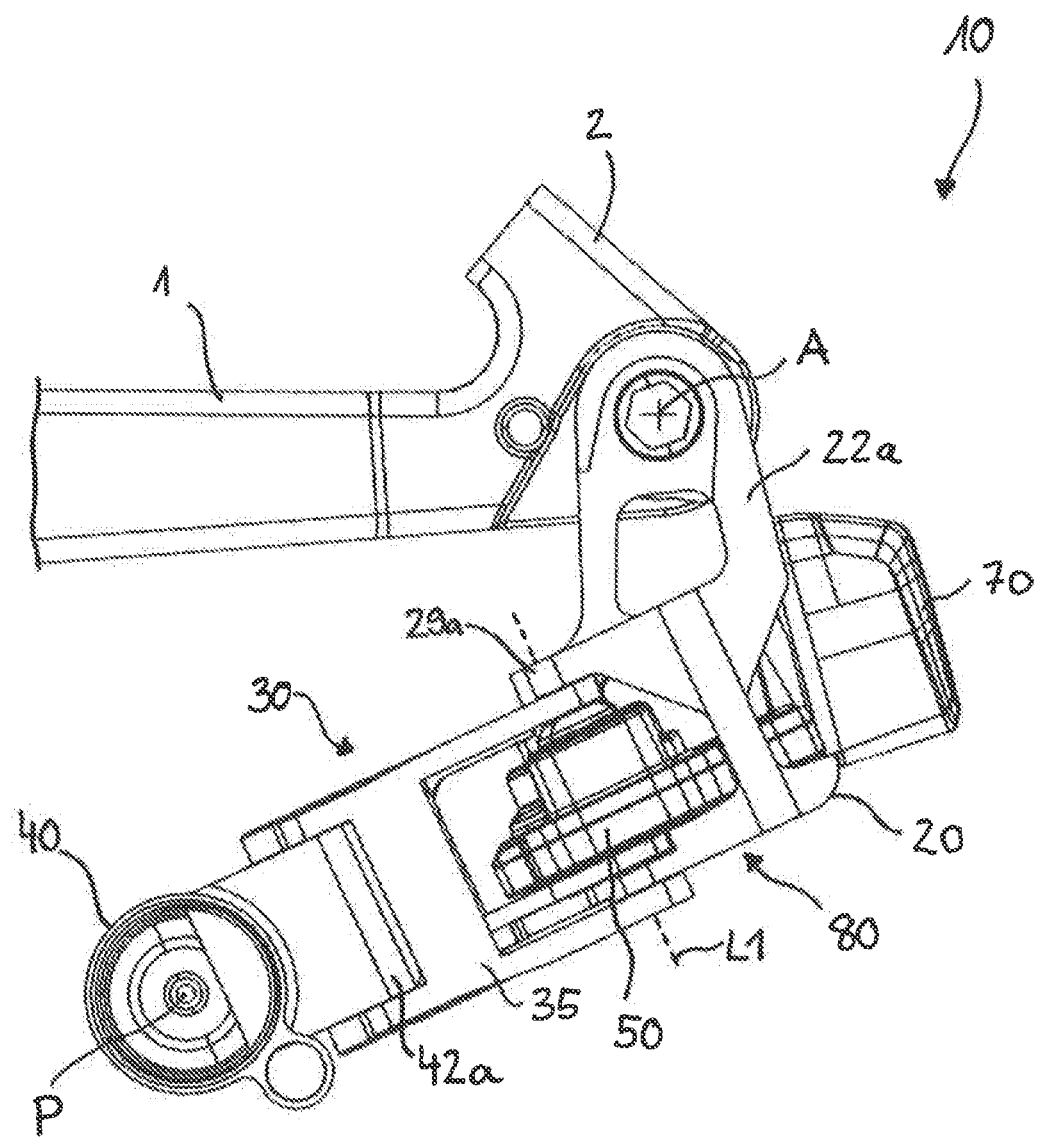
FIG. 2*b* is an interior view of the sub-assembly of FIG. 2*a*.

FIG. 2a shows an exterior view of the sub-assembly. The base member 20 has at its first, top connection end 21 two arms 22a and 22b which are spaced apart from one another in the axial direction. The arms 22a and 22b of the base member 20 engage around the right dropout 2 so that, in the mounted state, the first arm 22a is arranged on the inner side of the frame 1 and the second arm 22b is arranged on the outer side of the frame 1. The rear derailleur 10 is removably mounted on the frame 1 via the adapter 60, consisting of a bolt 61 and nut. The second arm 22b of the base member 20 is to be seen in the exterior view in FIG. 2a and the first arm 22a of the base member 20 is to be seen in the interior view in FIG. 2b.

Figure 2C:
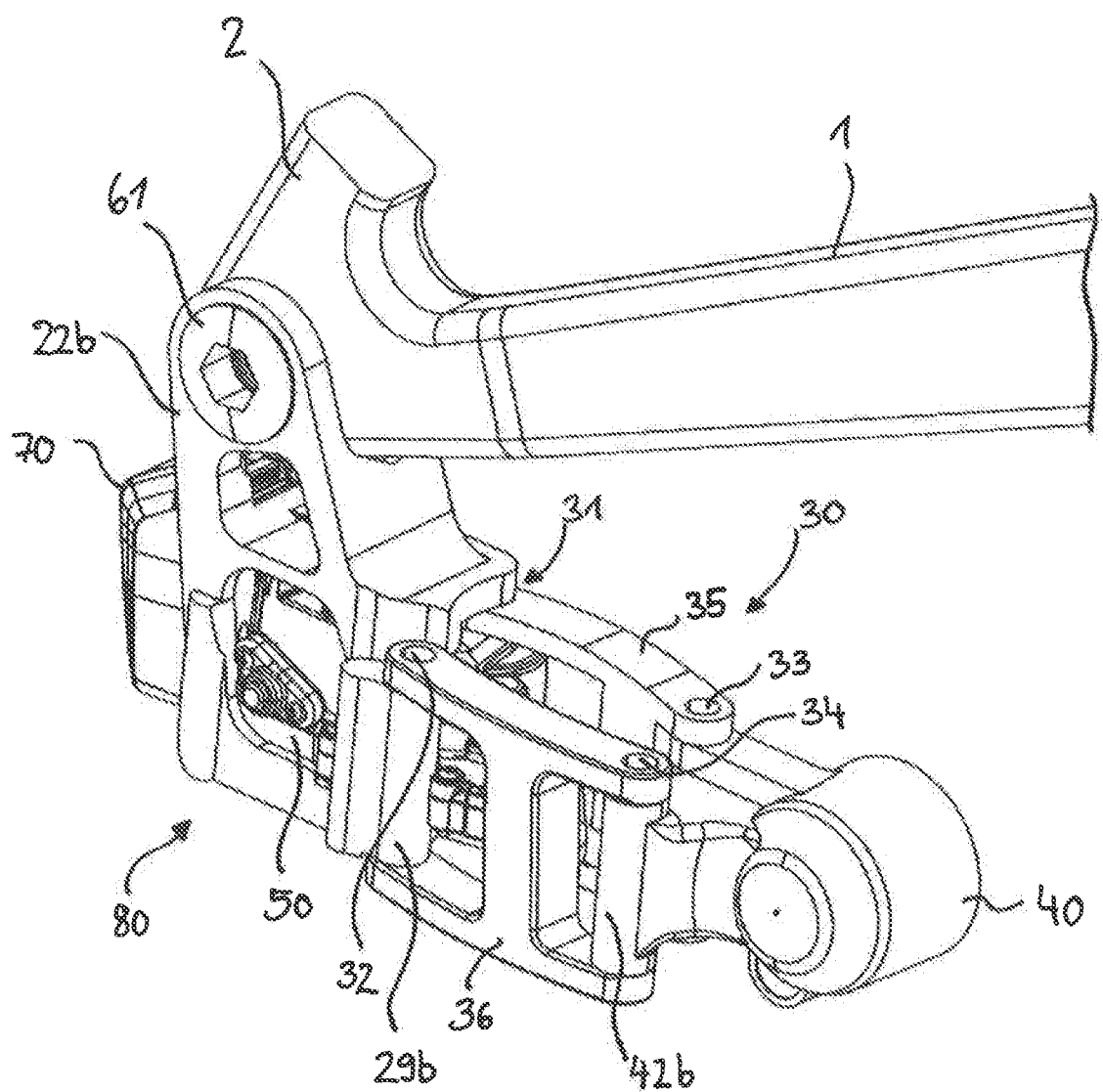
FIG. 2*c* is a perspective exterior view of the sub-assembly of FIG. 2*a*.
Figure 2D:
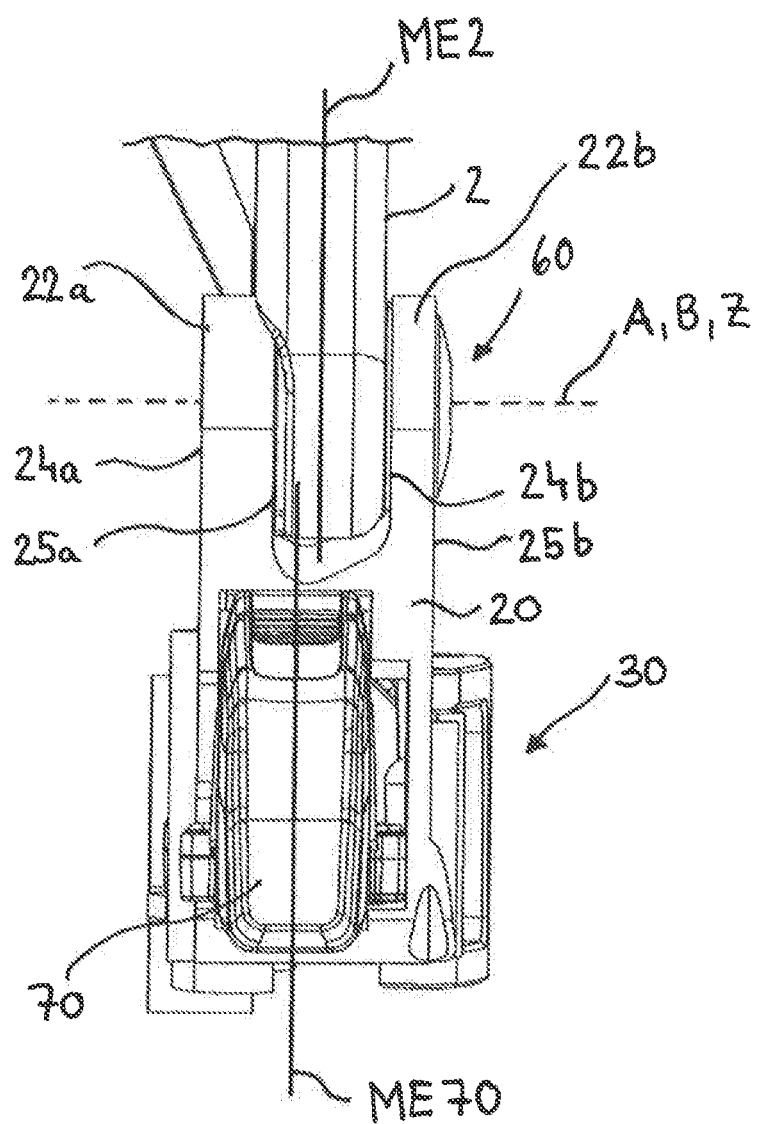
FIG. 2*d* is a rear view of the sub-assembly of FIG. 2*a*.

The engagement of the two arms 22a, 22b around the right dropout 2 is clearly visible in the perspective view in FIG. 2c and in the rear view in FIG. 2d.

Figure 3:
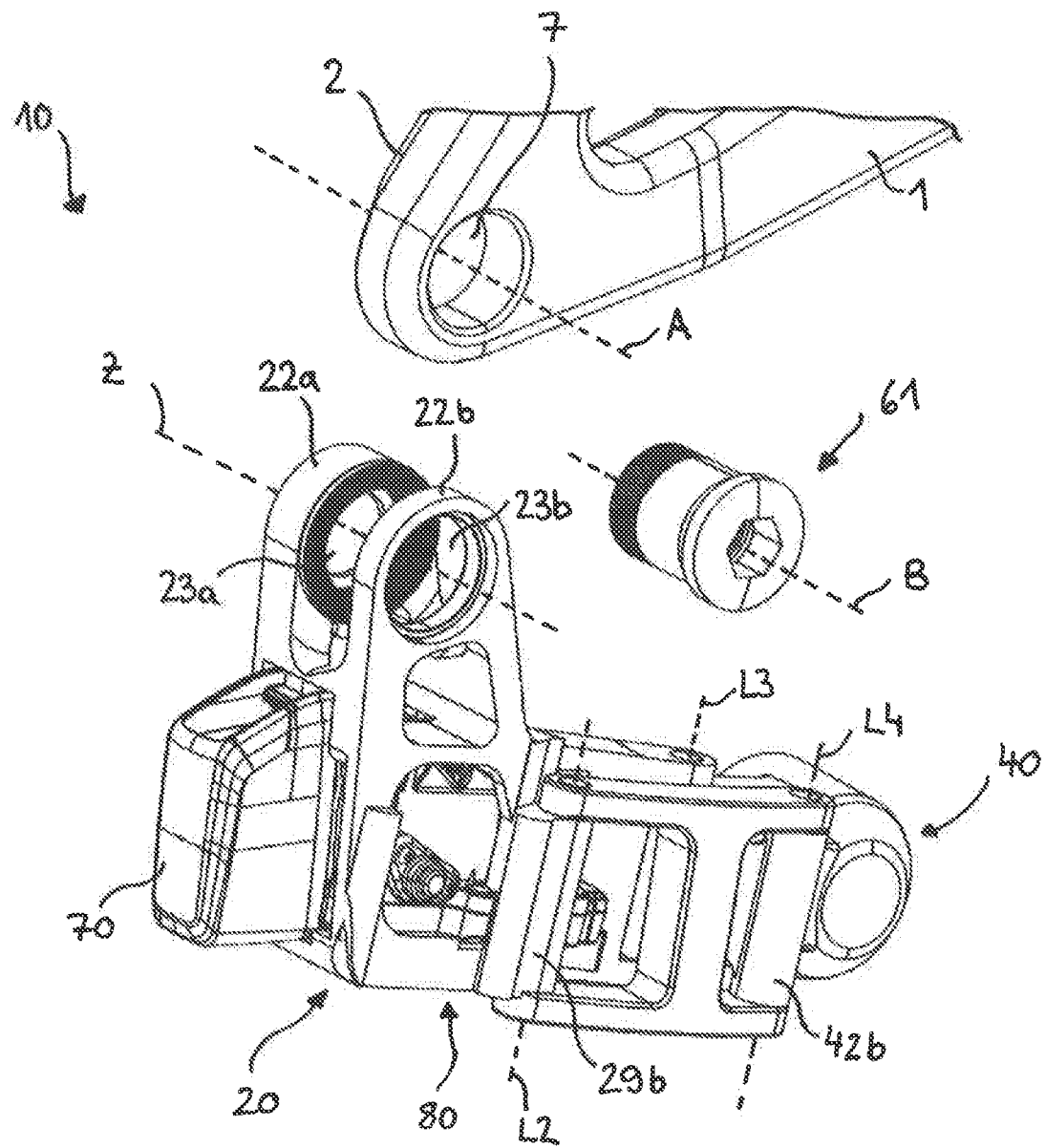
FIG. 3 is a perspective exploded view in an unmounted state according to an embodiment.

It can be seen in the perspective exploded view in FIG. 3 that the first arm 22a of the base member 20 has a first centring opening 23a and the second arm 22b has a second centring opening 23b. The centring openings 23a, 23b extend along the Z-axis. The frame 1 has at the right dropout 2 a frame opening 7, which extends coaxially with the rear wheel axis A. In the mounted state, the bolt 61 passes both through the two centring openings 23a, 23b in the arms 22a, 22b of the base member 20 and through the frame opening 7 and is screwed with the nut along its B-axis. The A-axis of the frame opening 7, the B-axis of the adapter 60, or bolt 61, and the Z-axis of the centring openings 23a and 23b of the base member 20 are visible in the unmounted state in the exploded view in FIG. 3.

In the mounted state, the B-axis of the adapter 60 and the Z-axis of the centring openings 23a, 23b of the base member 20 extend coaxially with the frame opening 7 and thus with the rear wheel axis A. The coincidence of the three axes A, B and Z in the mounted state is apparent from FIGS. 2a-d. The coaxial mounting of the electromechanical rear derailleur 10 on the rear wheel axis A is to be understood as meaning the coincidence of the B-axis of the rear derailleur 10 and the rear wheel axis A. In non-coaxially mounted rear derailleurs, the B-axis of the rear derailleur is spaced apart from the rear wheel axis A.

The base member 20 is coupled at its second, bottom connection end 29 with the pivot mechanism 30. The pivot mechanism 30 is in the form of a straight parallelogram four-bar joint and comprises an inner pivot arm 35, an outer pivot arm 36 and four pivot pins 31, 32, 33, 34. The pivot pins 31, 32, 33, 34 are in the form of axle pins. The base member 20 has at its second connection end 29 the first and second pin receivers 29a and 29b for receiving the first and second pivot pins 31, 32 of the pivot mechanism 30.

The inner pivot arm 35 is rotatably connected to the base member 20 via the first pivot pin 31. The first pivot pin 31 passes through the inner pivot arm 35 and the first pin receiver 29a on the base member 20. The inner pivot arm 35 is pivotable or rotatable relative to the base member 20 about the first pivot pin 31. In the same manner, the outer pivot arm 36 is connected to the base member 20 via the second pivot pin 32. The second pivot pin 32 passes through the outer pivot arm 36 and the second pin receiver 29b on the base member 20. The outer pivot arm 36 is rotatable relative to the base member 20 about the second pivot pin 32.

The third and fourth pivot pins 33, 34 connect the pivot mechanism 30 to the movable member 40 (P-knuckle). The movable member 40 has the third and fourth pin receivers 42a, 42b for receiving the third and fourth pivot pins 33, 34 of the pivot mechanism 30. The inner pivot arm 35 is rotatably connected to the movable member 40 via the third pivot pin 33. The third pivot pin 33 passes through the inner pivot arm 35 and the third pin receiver 42a on the movable member 40. The inner pivot arm 35 is thus pivotable or rotatable relative to the movable member 40 about the third pivot pin 33. In the same manner, the outer pivot arm 36 is connected to the movable member 40 via the fourth pivot pin 34. The fourth pivot pin 34 passes through the outer pivot arm 36 and the fourth pin receiver 42b on the movable member 40. The outer pivot arm 36 is rotatable relative to the movable member 40 about the fourth pivot pin 34.

The movable member 40, and thus also the chain guiding arrangement 90, are moved in the axial direction by pivoting of the pivot mechanism 30 relative to the stationary base member 20 (horizontal movement). On shifting from one sprocket diameter to the next, the chain tension changes, which leads to rotation of the chain guiding arrangement about the P-axis. As a result of the rotation of the chain guiding arrangement relative to the movable member 40 about the P-axis, the distance of the chain guiding rollers relative to the sprocket cluster changes (vertical movement).

In the exemplary embodiments shown, the four pivot pins 31, 32, 33, 34 each extend orthogonally to the rear wheel axis A. The pivot pins 31, 32, 33, 34 each lie in planes which extend parallel to the sprocket planes (see FIG. 1). As is apparent from FIGS. 2 and 3, the longitudinal axes L1, L2 of the pin receivers 29a, 29b on the base member 20 and the longitudinal axes L3, L4 of the pin receivers 42a, 42b on the movable member 40 are also oriented correspondingly orthogonally to the rear wheel axis A.

The electromechanical drive 80 of the electromechanical rear derailleur 10 is further shown in FIGS. 2 and 3. The electromechanical drive 80 is suitable for driving the pivot mechanism 30. The drive 80 is arranged in the region of the base member 20. The base member 20 defines a cavity in which the electromechanical drive 80 is arranged. In the embodiment shown, the electromechanical drive 80 is enclosed by a gear housing 50. The gear housing 50 is held in a form- and force-fitting manner in the cavity of the base member 20.

The base member 20 can be in two- or multi-part form, in order to facilitate insertion of the gear housing 50 with the drive 80. Alternatively, the gear housing 50 could be introduced from an open side of the base member 20 and then connected to the base member 20.

The positioning of the electromechanical drive 80 and of the power source 70 in relation to the bicycle frame 1, or the right dropout 2, is apparent from FIG. 2*d*. The electromechanical drive 80 in the housing 50 is supplied with power by the power source 70. The power source 70 is removably attached to the base member 20. A notional midplane ME70 extends centrally through the power source 70. The midplane ME70 extends through the power source 70 from top to bottom and from the rear to the front. The power source 70 is so connected to the base member 20 that its midplane ME70 runs between the first arm 22*a* and the second arm 22*b* of the base member 20.

The first arm 22*a* has an axial first arm inner side 24*a* and an axial first arm outer side 25*a*, which is arranged opposite the first arm inner side 24*a*. The second arm 22*b* likewise has an axial second arm inner side 24*b* and an axial second arm outer side 25*b*, which is arranged opposite the second arm inner side 24*b*. The first arm inner side 24*a* of the first arm 22*a* and the second arm outer side 25*b* of the second arm 22*b* face away from one another. The first arm outer side 25*a* of the first arm 22*a* and the second arm inner side 24*b* of the second arm 22*b* face towards one another. The midplane ME70 of the battery 70 runs in the axial direction between the first arm inner side 24*a* of the first arm 22*a* and the second arm outer side 25*b* of the second arm 22*b*. The midplane ME70 of the battery 70 runs between the first arm outer side 25*a* of the first arm 22*a* and the second arm inner side 24*b* of the second arm 22*b*.

A notional midplane ME2 can also be associated with the right dropout 2 of the bicycle frame 1. In the mounted state of the rear derailleur 10, the midplane ME2 of the dropout 2 likewise runs between the first arm 22*a* and the second arm 22*b* of the base member 20, in particular between the first arm outer side 25*a* of the first arm 22*a* and the second arm inner side 24*b* of the second arm 22*b*.

The midplane ME70 of the power source 70 runs approximately in the region of the midplane ME2 of the dropout 2. The midplane ME70 runs further inwards in the axial direction than the midplane ME2 of the dropout 2. That is to say, the power source 70 is arranged approximately in a plane—or approximately flush—with the dropout 2. The power source 70 can be arranged offset axially inwards in relation to the dropout 2.

The electromechanical drive 80 of the rear derailleur 10 is correspondingly also arranged in the region of the midplane ME2 of the dropout 2.

The coaxial mounting of the rear derailleur 10 along the rear wheel axis A allows the electromechanical drive 80 and the power source 70 to be arranged approximately in a plane with the dropout 2. The coaxial rear derailleur 10, and thus also the electromechanical drive 80, are arranged less exposed relative to the frame 1 and therefore better protected. This is true equally for all three embodiments.

Figure 4:
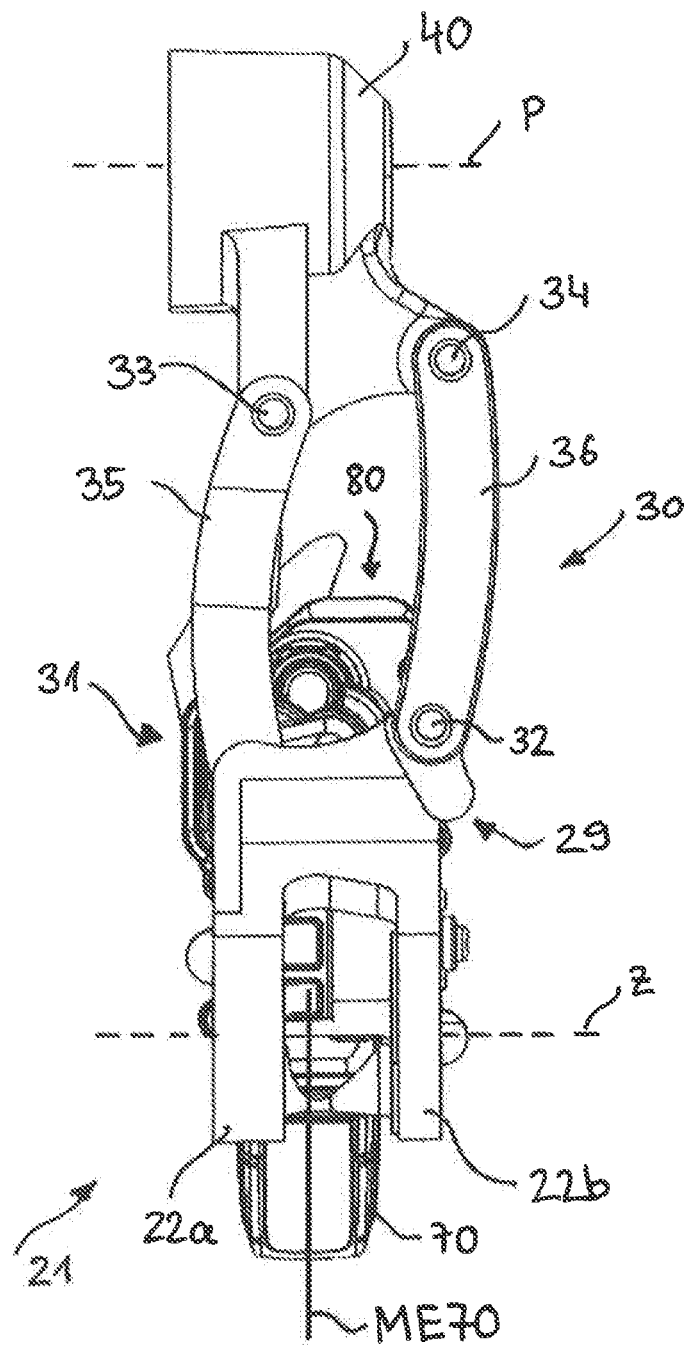
FIG. 4 is a plan view of the sub-assembly without the frame according to an embodiment.

FIG. 4 is a plan view of the sub-assembly of FIG. 2*a* without the adapter 60. The sub-assembly is not mounted on the frame. In this view too, the midplane ME70 of the power source 70 is shown, which extends, when seen in the axial direction A, between the inner arm 22*a* and the outer arm 22*b* of the base member 20.

The electromechanical drive 80 is surrounded by the gear housing 50 and arranged at least in part in a cavity of the base member 20. A midplane of the electromechanical drive 80 running approximately centrally, which extends from the front to the rear and from top to bottom through the gear housing 50, likewise runs between the inner arm 22*a* and the outer arm 22*b* of the base member 20. The midplane of the electrical drive 80 runs along its longitudinal axis and intersects the Z-axis of the centring openings of the arms 22*a*, 22*b* at a right angle. In the axial direction, the midplane of the electrical drive 80 runs between the inner arm 22*a* and the outer arm 22*b*. The midplane of the electrical drive 80 runs in the axial direction between the first arm inner side 24*a* of the first arm 22*a* and the second arm outer side 25*b* of the second arm 22*b*. The midplane of the electrical drive 80 runs between the first arm outer side 25*a* of the first arm 22*a* and the second arm inner side 24*b* of the second arm 22*b*.

Figure 5A:
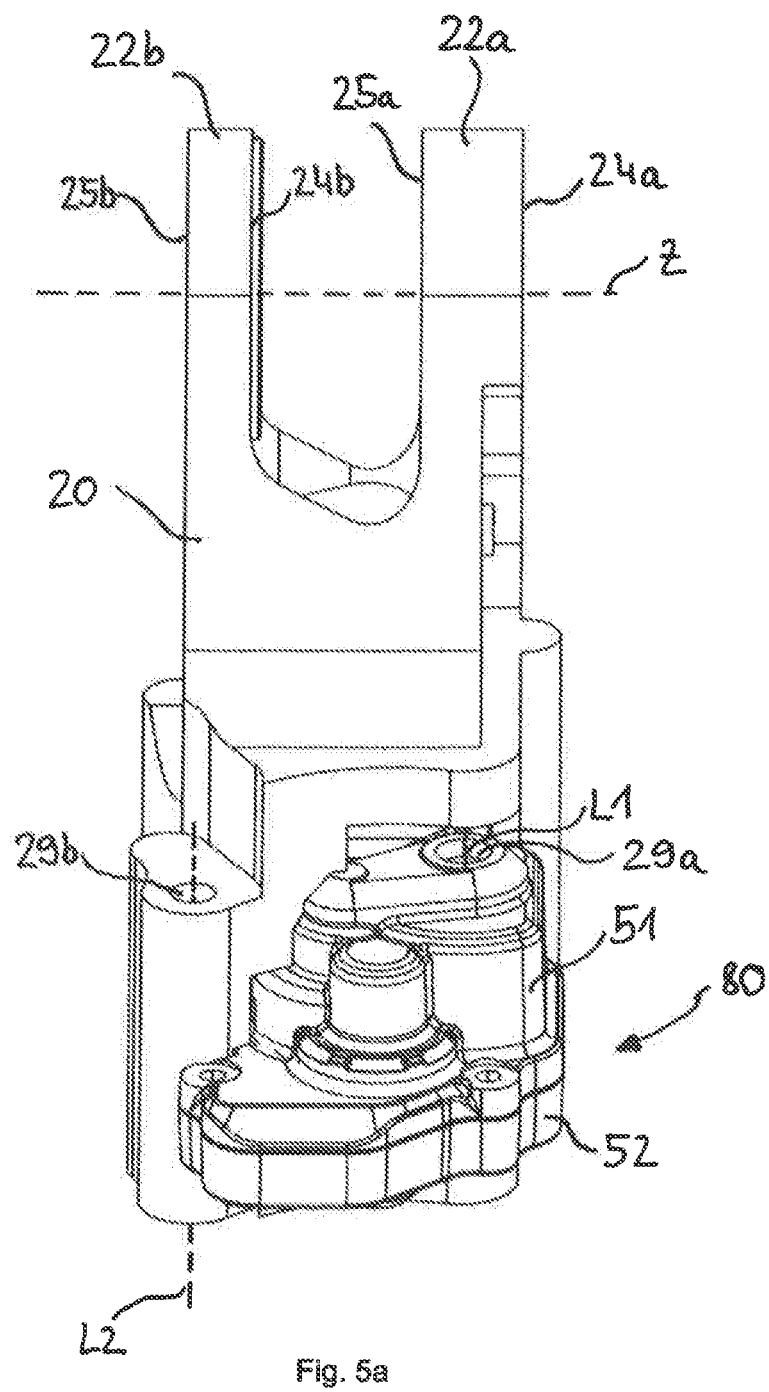
FIG. 5*a* is a front view of the reduced sub-assembly (without the movable member) according to an embodiment.

The positioning of the electrical drive 80 relative to the base member 20 is also visible in the front view of the further reduced sub-assembly in FIG. 5*a*. For the sake of clarity, only the base member 20 and the electromechanical drive 80 arranged in the cavity of the base member 20 are shown. The gear housing 50 surrounds the electromechanical drive 80. The notional midplane of the electrical drive 80 runs between the first arm outer side 25*a* of the first arm 22*a* and the second arm inner side 24*b* of the second arm 22*b*.

Figure 5B:
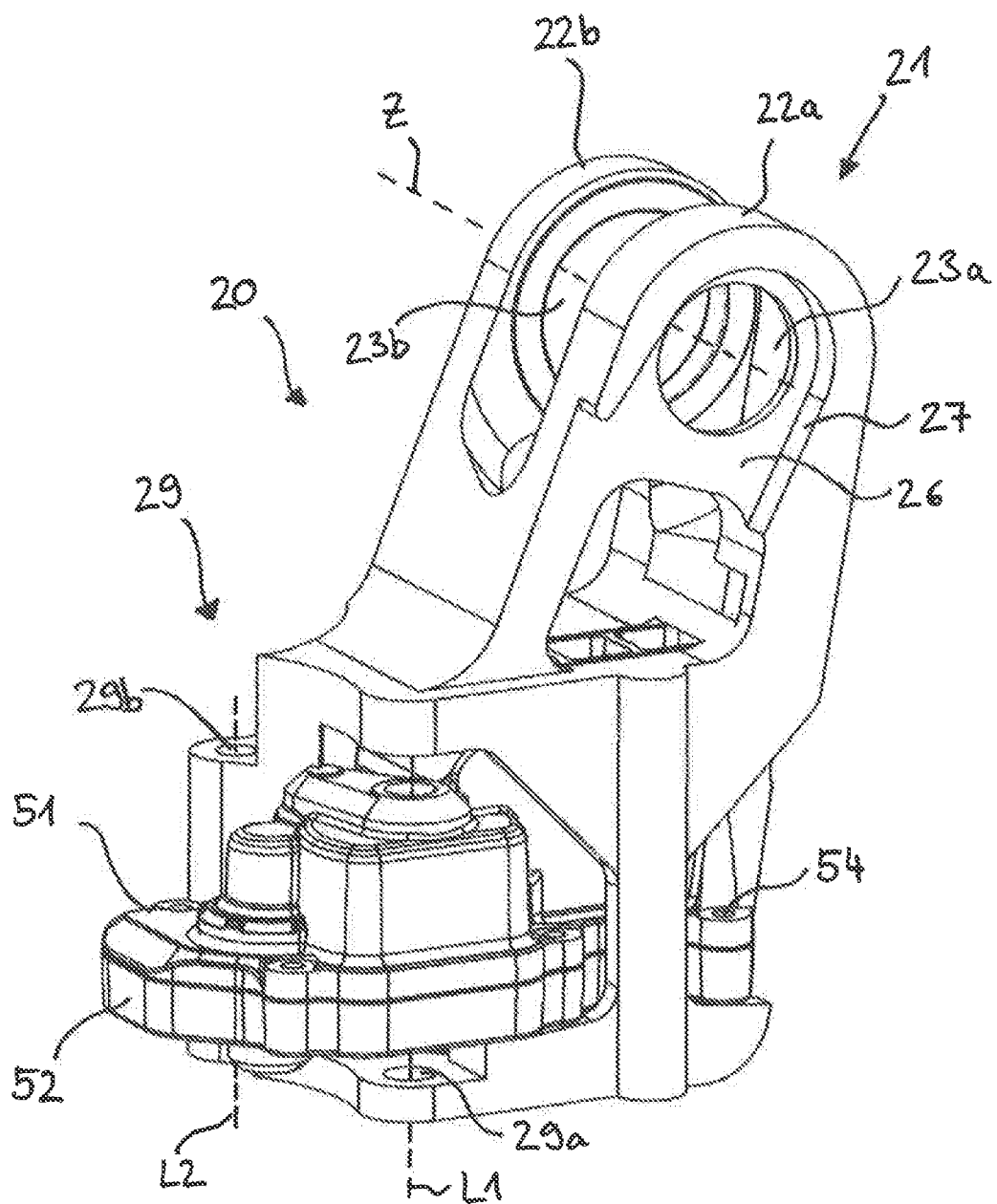
FIG. 5*b* is a perspective interior view of the sub-assembly of FIG. 5*a*.

FIG. 5*b* is a perspective interior view of the sub-assembly of FIG. 5*a*. The gear housing 50 has a first housing part 51 and a second housing part 52, which are connected, for example screwed, together at multiple housing joining points 54.

In this view, the centring openings 23*a* and 23*b* in the arms 22*a* and 22*b* of the base member 20 are visible, which openings extend along the Z-axis. In addition, a hub guide 27 and an axial hub stop surface 26 are formed on the axial inner side of the first connection end 21 of the base member 20. The hub guide 27 is in the form of a flange with converging guide surfaces. For the mounting of a rear wheel, not shown here, the wheel is guided together with the hub arrangement and the hub end cap along the hub guide 27 of the base member 20. In its end position, the hub end cap lies radially against the hub guide 27. In the axial direction, the hub end cap abuts the axial hub stop surface 26. The base member 20, and thus the rear derailleur 10 as a whole, is referenced to the hub—and not, as in conventional rear derailleurs, to the frame 1.

At the second connection end 29 of the base member 20 there are arranged the first pin receiver 29*a* and the second pin receiver 29*b*. The first pin receiver 29*a* for receiving the first pivot pin 31 of the pivot mechanism 30 extends along the longitudinal axis L1. The second pin receiver 29*b* extends along the longitudinal axis L2 and is configured to receive the second pivot pin 32 of the pivot mechanism 30.

The first pin receiver 29*a* of the base member 20 lies approximately in a first plane with the first arm 22*a* of the base member 20. The second pin receiver 29*b* of the base member 20 lies approximately in a second plane with the second arm 22*b* of the base member 20. In the mounted state of the rear derailleur 10, the first plane is located axially further inwards than the second plane. The electromechanical drive 80 is arranged at least in part between the first and second planes. The first and second planes of the base member 20 intersect the rear wheel axis A at a right angle.

Figure 6:
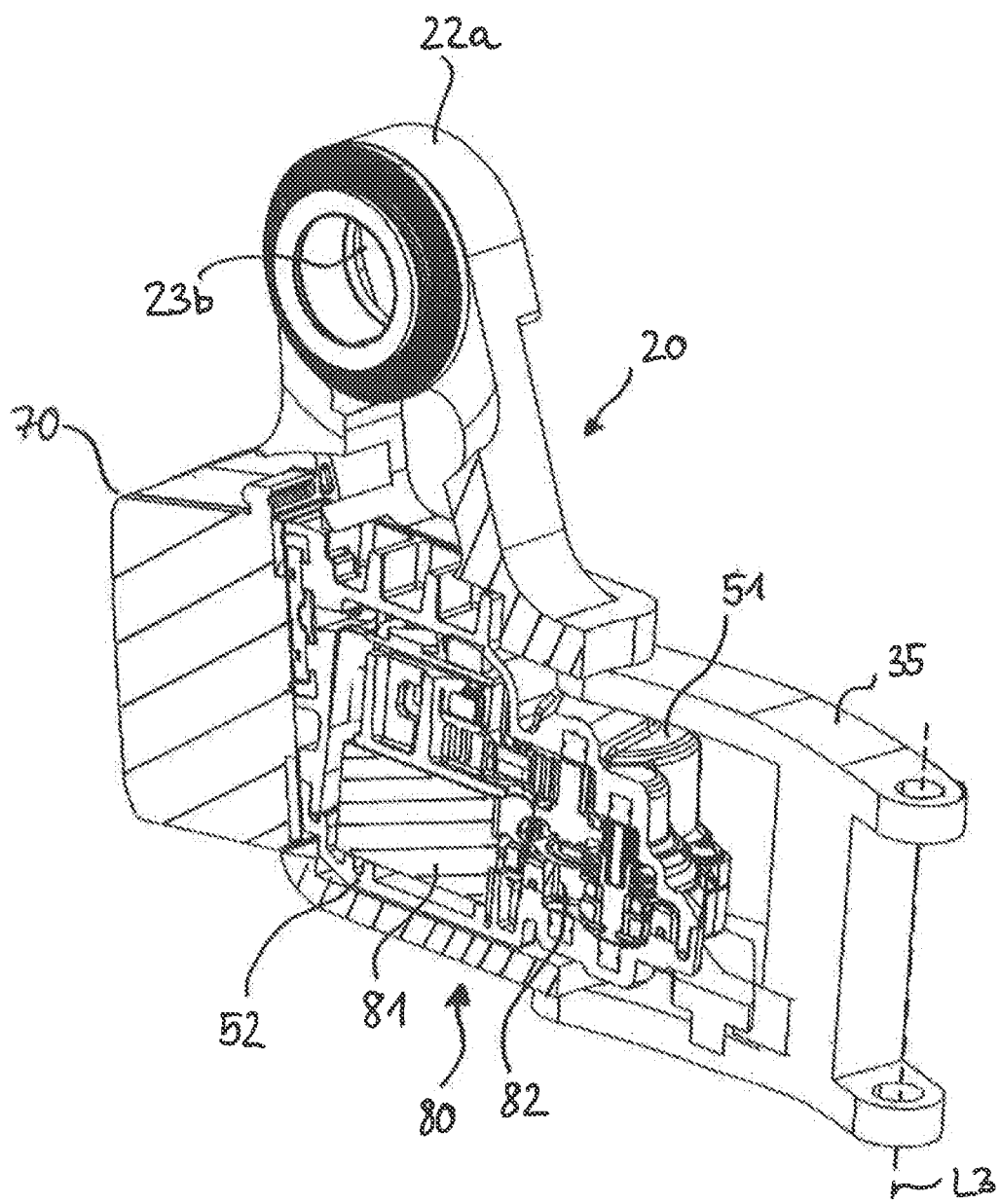
FIG. 6 is a perspective representation of a longitudinal section through a sub-assembly according to an embodiment.

FIG. 6 shows a perspective representation of a longitudinal section through a sub-assembly of the rear derailleur 10. The longitudinal section runs approximately along the midplane of the electrical drive 80 and thus also between the first and the second arm 22a, 22b. In this view, only the inner half of the sub-assembly, namely the inner arm 22a with the centring opening 23a and the inner pivot arm 35, is to be seen. In the longitudinal section, the electrical drive 80 arranged in the housing 50 between the top housing part 51 and the bottom housing part 52 is visible. The electrical drive 80 comprises a motor 81, an output shaft 83 and multiple interposed gear stages 82. The motor 81 is electrically connected to the power source 70. The motor 81 is controlled by wirelessly transmitted shift signals of the shifter 6 and drives the gear 82 and the output shaft 83 in one direction of rotation or the other according to the shift signal. The longitudinal section also runs approximately along the longitudinal axis of the motor 81.

Figure 7:
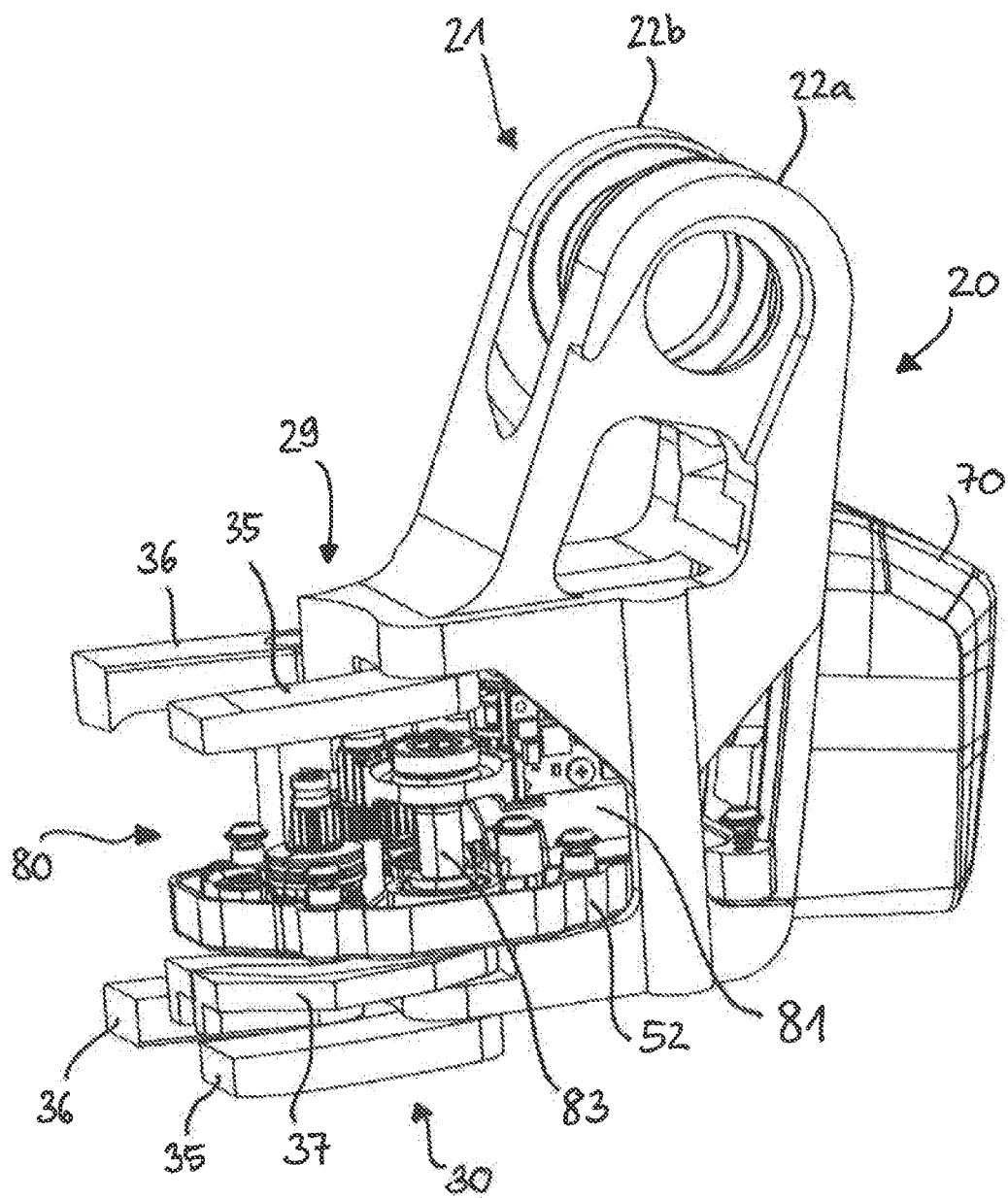
FIG. 7 is a perspective representation of a cross-section through a sub-assembly without the housing top part according to an embodiment.

FIG. 7 shows a perspective representation of a cross-section through the reduced sub-assembly. The sub-assembly comprises the pivot mechanism 30, the base member 20, the electromechanical drive 80 and the battery 70. The cross-section runs through the pivot arms 35, 36 of the pivot mechanism 30. The top housing part 51 is faded out and allows the electromechanical drive 80 to be seen. The motor 81 drives the gear stages 82 and the output shaft 83. The longitudinal axis of the motor 81 is approximately perpendicular to the output shaft 83. The output shaft 83 is secure in rotation with the drive arm 37, which drives the pivot mechanism 30. An electronic controller is arranged above the motor 81 and is electrically connected to the motor 81.

Figure 8:
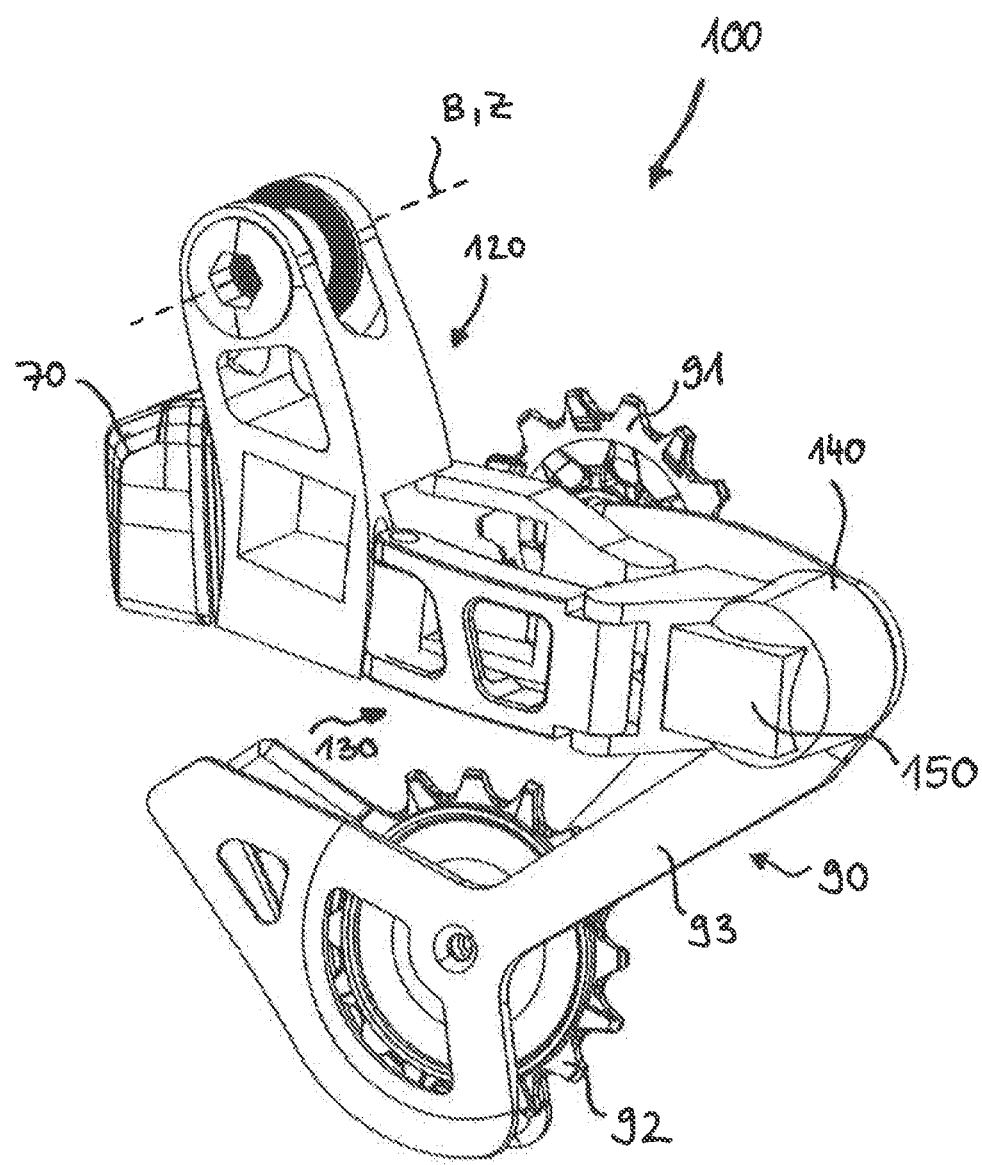
FIG. 8 is a perspective exterior view of a second embodiment.
Figure 9:
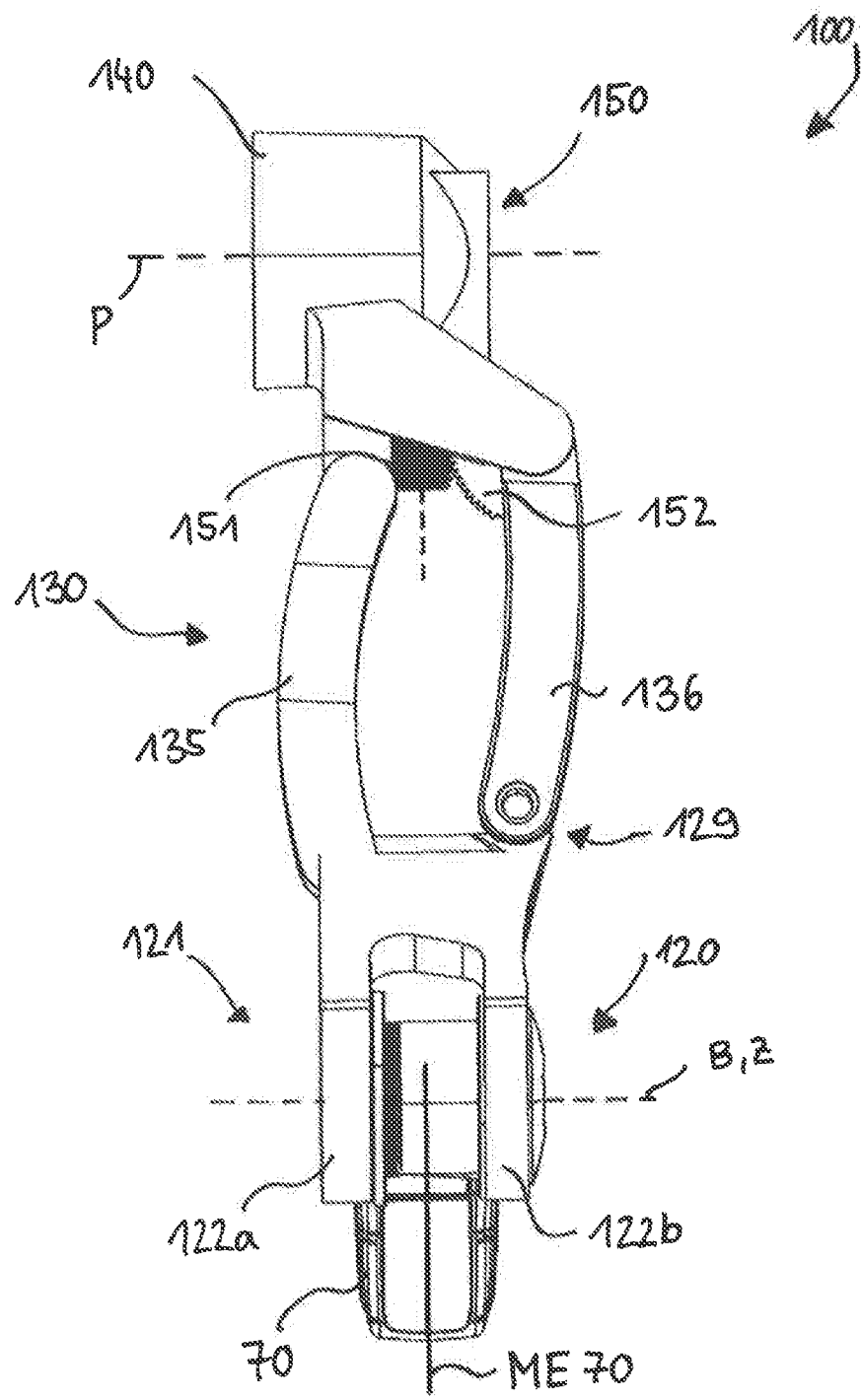
FIG. 9 is a plan view of the second embodiment without the chain guiding arrangement.

FIGS. 8 and 9 show a second embodiment of an electromechanical rear derailleur 100 for coaxial mounting with the rear wheel axis A. The second embodiment differs from the preceding embodiment primarily by the position of the electromechanical drive 150. The drive 150 is arranged in the region of the movable member 140. The drive 150 is arranged at least in part in a cavity defined by the movable member 140 and is fixed to the movable member 140.

The remaining parts of the alternative rear derailleur 100 differ slightly from the preceding embodiment. The base member 120 has at its first connection end 121 two arms 122a, b, through which, for mounting on the bicycle frame, there passes a bolt along the B-axis, or Z-axis. The base member 120 has at its second connection end 129 two pin receivers for the pivot pins for the rotatable mounting of the pivot arms 135, 136 of the pivot mechanism 130. The longitudinal axes of the pin receivers run substantially parallel to the sprocket planes, or intersect the rear wheel axis A at a right angle.

FIG. 8 also shows a chain guide arrangement 90. The chain guide arrangement 90 is connected to the movable member 140 for rotation about the axis P and is biased CW (to the rear) so that a chain, not shown here, which passes through the chain guide 90 in an s-shape is tensioned. The chain guide arrangement 90 comprises a top and a bottom chain guide roller 91, 92, which are each rotatably mounted between two cage halves of the cage 93. The axis of rotation of the top chain guide roller 91 is spaced apart from the P-axis of the movable member 140. The top chain guide roller 91 is arranged at a smaller distance from the P-axis than the bottom chain guide roller 92. The chain guide arrangement 90 rotates about the P-axis according to the shift position and the chain tension. Thus, the position of the chain guide rollers 91, 92 relative to the sprocket cluster 4 changes. The chain guide arrangement 90 can likewise be combined with the other embodiments.

In the second exemplary embodiment, the electromechanical drive is in the form of a motor-operated worm gear 150. A motor-operated worm 151 is mounted on the movable member 140. As in the preceding exemplary embodiment, the motor is controlled by wirelessly transmitted shift signals of the shifter 6 and drives the worm 151 in one direction of rotation or the other according to the shift signal. The electronic controller is electrically connected to the motor of the electromechanical drive and can be configured in a known manner. The worm 151 cooperates with the worm wheel 152 on the pivot mechanism 130. The worm wheel 152 is in the form of a segmented wheel, for example a quarter wheel, on the outer pivot arm 136. According to the direction of rotation of the worm 151, the pivot mechanism 130, and thus also the movable member 140 together with the chain guiding arrangement 90, moves either axially inwards or axially outwards.

A midplane of the electrical drive 150 running approximately centrally, which extends through the drive 150 from the front to the rear and from top to bottom, runs in relation to the base member 120 between the inner arm 122a and the outer arm 122b of the base member 120. In addition, the midplane of the electrical drive 150 runs in relation to the pivot mechanism 130 between the first and second pivot arm 135, 136 of the pivot mechanism 130.

The power source 70 is arranged rearward on the base member 120 and supplies power to the electromechanical drive 150. The midplane ME70 of the battery 70 runs, as in the preceding exemplary embodiment, when seen in the axial direction, between the first and the second arm 122a, 122b of the base member 120. The distance between the power supply 70 and the electrical drive 150 can be bridged by an electric cable. Alternatively, the power source could also be arranged in the immediate vicinity of the movable member and be connected directly to the electromechanical drive. The electromechanical drive arranged in the region of the movable member could also be in the form of a multi-stage gear with an output shaft—similarly to the preceding exemplary embodiment. The output shaft would then be connected to the pivot mechanism in a rotationally secure manner and would drive the pivot mechanism.

Figure 10:
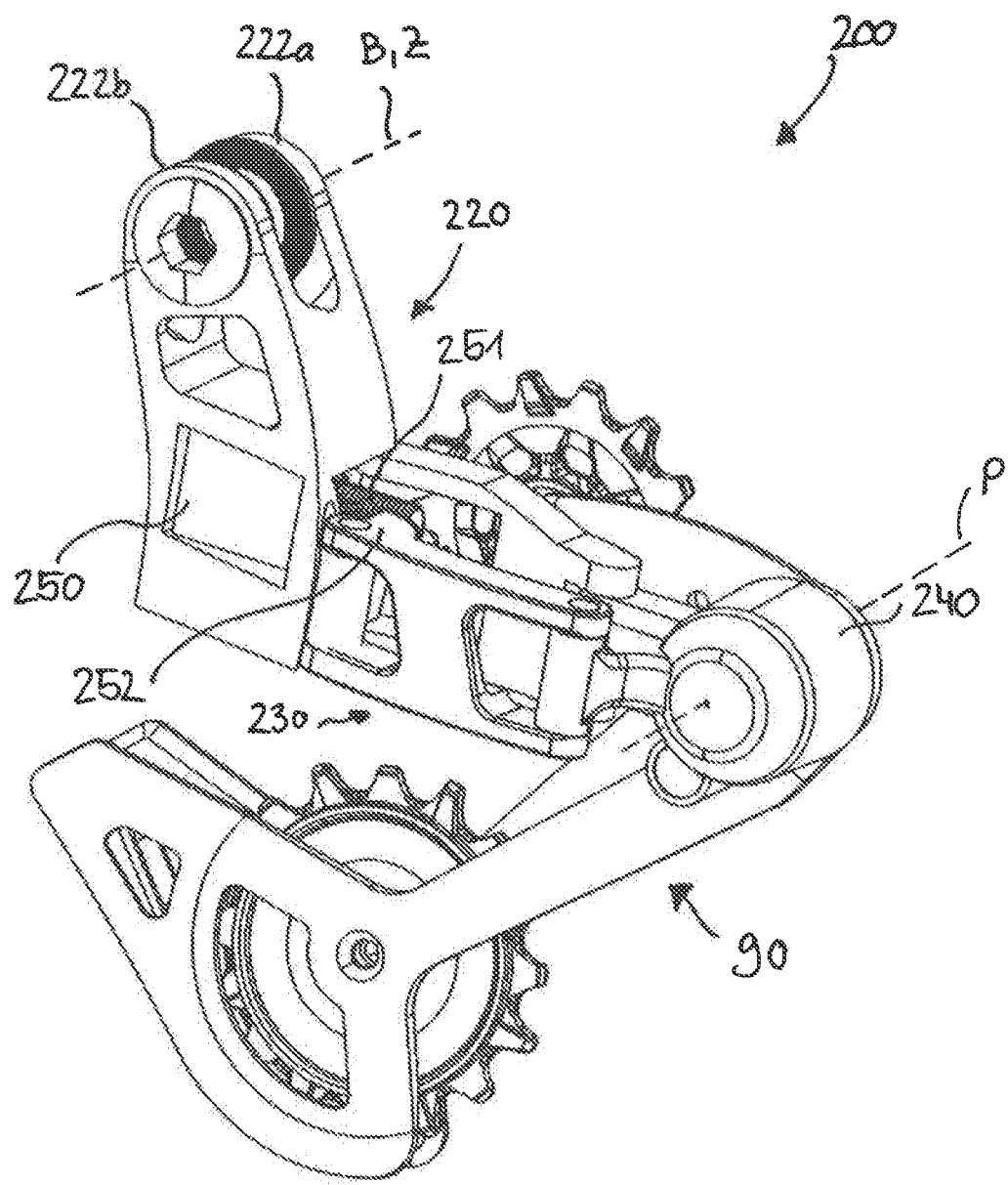
FIG. 10 is a perspective exterior view of a third embodiment.
Figure 11A:
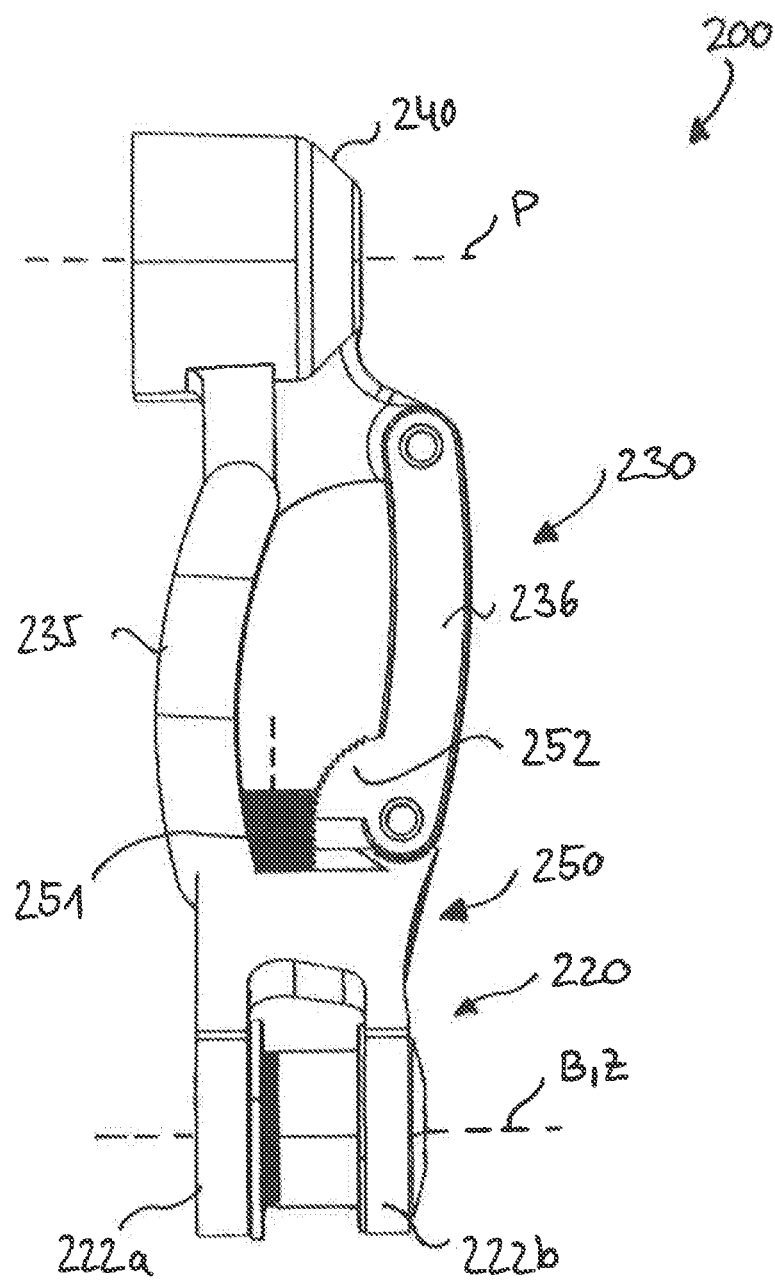
FIG. 11a is a plan view of the third embodiment without the chain guiding arrangement.
Figure 11B:
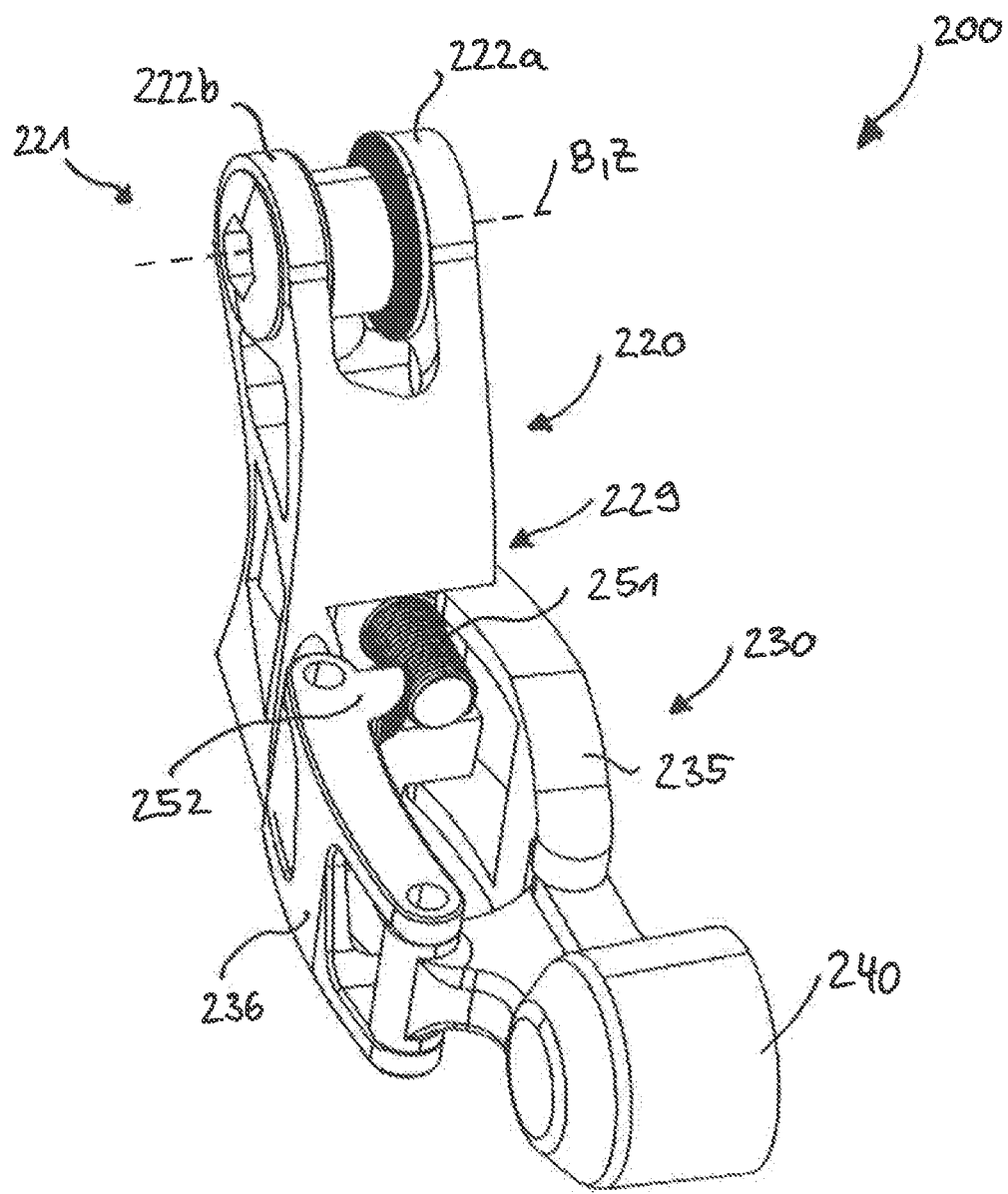

FIGS. 10, 11a and 11b show a third embodiment of the electromechanical rear derailleur 200. The electrical drive 250 is arranged in the region of the base member 220. The drive 250 is arranged at least in part in a cavity defined by the base member 220 and is held in a form-fitting manner therein.

The remaining parts of the alternative rear derailleur 200 differ slightly from the preceding embodiment. The base member 220 has at its first connection end 221 two arms 222a, b, through which, for mounting on the bicycle frame, there passes a bolt along the B-axis, or Z-axis, and which run coaxially with the rear wheel axis A. The base member 220 has at its second connection end 229 two pin receivers for the pivot pins for the rotatable mounting of the pivot arms 235, 236 of the pivot mechanism 230.

In the third exemplary embodiment, the electromechanical drive is in the form of a motor-operated worm gear 250. The motor-operated worm 251 is arranged in the base member 220 and connected thereto. As in the preceding exemplary embodiment, the motor is controlled by wirelessly transmitted shift signals of the shifter 6 and drives the worm 251 in one direction of rotation or the other according to the shift signals. The worm 251 cooperates with the worm wheel 252 on the pivot mechanism 230. The worm wheel 252 is in the form of a segmented wheel, in particular a quarter wheel, on the outer pivot arm 236. According to the direction of rotation of the worm 251, the pivot mechanism 230, and thus also the movable member 240 together with the chain guiding arrangement 90, moves either axially inwards or axially outwards. In FIGS. 11a and 11b, the chain guiding arrangement is not shown.

A midplane of the electromechanical drive 250 running approximately centrally, which extends through the drive 250 from the front to the rear and from top to bottom, runs between the inner arm 222a and the outer arm 222b of the base member 220.

The power source is also not shown in this embodiment. The power source could, however, be arranged rearward on the base member, exactly as in the preceding exemplary embodiments, and supply power to the electrical drive 250. The midplane of the battery would run exactly as in preceding embodiments between the arms 222a, 222b of the base member 220. The battery would be arranged in relation to the frame flush with the dropout.

Generally speaking, the electromechanical drive 80, 150, 250 is arranged in the region between the base member (B-knuckle) 20, 120, 220 and the movable member (P-knuckle) 40, 140, 240 of the rear derailleur 10, 100, 200, in particular, the electromechanical drive 80, 150, 250 is arranged between the B-axis of the base member and the P-axis of the movable member.

The longitudinal axis of the motor 81, 151, 251 of the electromechanical drive 80, 150, 250 extends through the electromechanical drive from the rear to the front. The longitudinal axis of the motor 81, 151, 251 is perpendicular to the longitudinal axes L1, L2 of the pin receivers 29a, 29b of the base member 20, 120, 220. The longitudinal axis of the motor 81, 151, 251 runs in the axial direction between the first and the second arm 22a, 22b of the base member 20, 120, 220.

It is an advantage of the configuration of the base member 20, 120, 220 with a first and second arm 22a, 22b that, because of the spaced apart bearing points on the adapter 60, the rear derailleur 10, 100, 200 as a whole is less susceptible to tilting relative to the dropout 2 in the event of impacts from outside. These advantages are obtained for all three embodiments equally.

The arrangement of the electromechanical drive 80, 250 in a cavity of the base member 20, 220 offers additional protection. The base member 20, 220 surrounds the drive 80, 250 in the manner of a cage. Parts of the electrical drive 80, 150 that protrude forwards beyond the base member 20, 220 are enclosed by the pivot mechanism 30, 230. These advantages are obtained for the first embodiment (FIGS. 2 to 7) and third embodiment (FIGS. 10 and 11) equally.

The arrangement of the electromechanical drive 150 in a cavity of the movable member 140 likewise offers protection. The movable member 140 surrounds the drive 140. Parts of the electrical drive 140 that protrude beyond the movable member 140 are enclosed by the pivot mechanism 130 (FIGS. 8 and 9).

FIGS. 12 to 19 show further embodiments of electromechanical rear derailleurs 300, 400, 500 and 600 for coaxial mounting with the rear wheel axis A. In these embodiments, the electromechanical drive, as in the first exemplary embodiment (FIGS. 2 to 7), is arranged in the region of the base member. The drive is arranged at least in part in a cavity defined by the base member and is fixed to the base member. The rear derailleurs 300, 400, 500, 600 are the same as the first embodiment in large parts. In order to avoid repetition, the differences between the embodiments will primarily be discussed hereinbelow.

Figure 12:
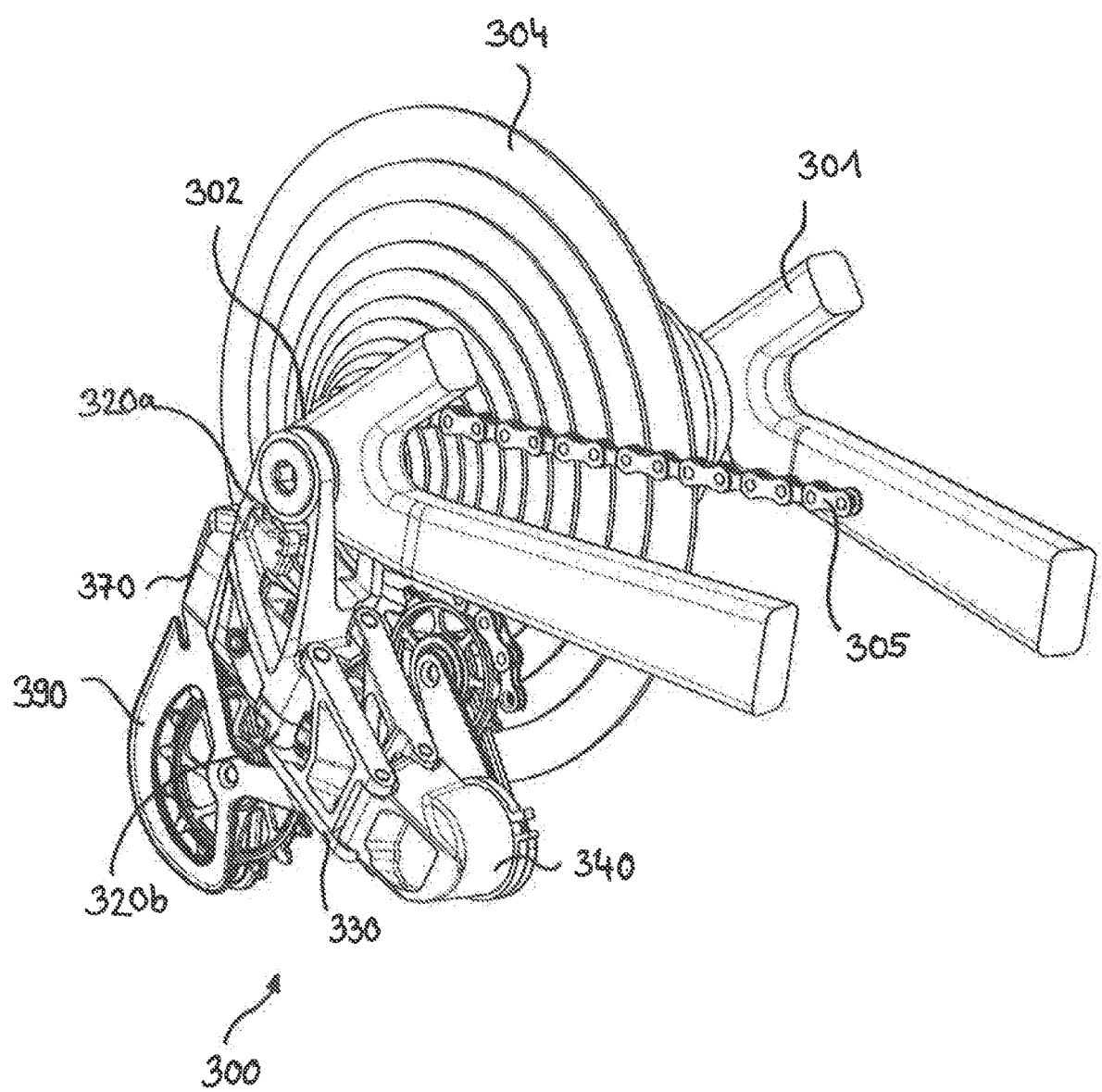
FIG. 12 is a perspective exterior view of a fourth embodiment of the electromechanical rear derailleur mounted on the frame.

FIG. 12 is a perspective exterior view of the fourth embodiment of the electromechanical rear derailleur 300 mounted on the right dropout 302 of the frame 301. The coaxial mounting by the bolts along the rear wheel axis A, or the B-axis, corresponds to the preceding exemplary embodiments. The sprocket cluster 304 is shown schematically and rotates about the rear wheel axis A. Such a sprocket cluster 304 can comprise 12 sprockets, for example, wherein the smallest sprocket has ten teeth and the largest sprocket has 52 teeth. The chain 305 passes through the chain guiding arrangement 390 in an s-shape and is in engagement with the teeth of the top and bottom chain guiding rollers and with the teeth, not shown here, of the sprocket cluster 304.

The rear derailleur 300 comprises a two-part base member 320a, 320b, a movable member 340, a chain guiding arrangement 390 and a pivot mechanism 330, which connects the base member 320 to the movable member 340. The electromechanical drive for driving the pivot mechanism 330 is received in the gear housing 350 and is held by the base member 320. The power source 370 is attached to the base member 320 at the rear. The pivot pins correspond to the preceding embodiments.

Figure 13A:
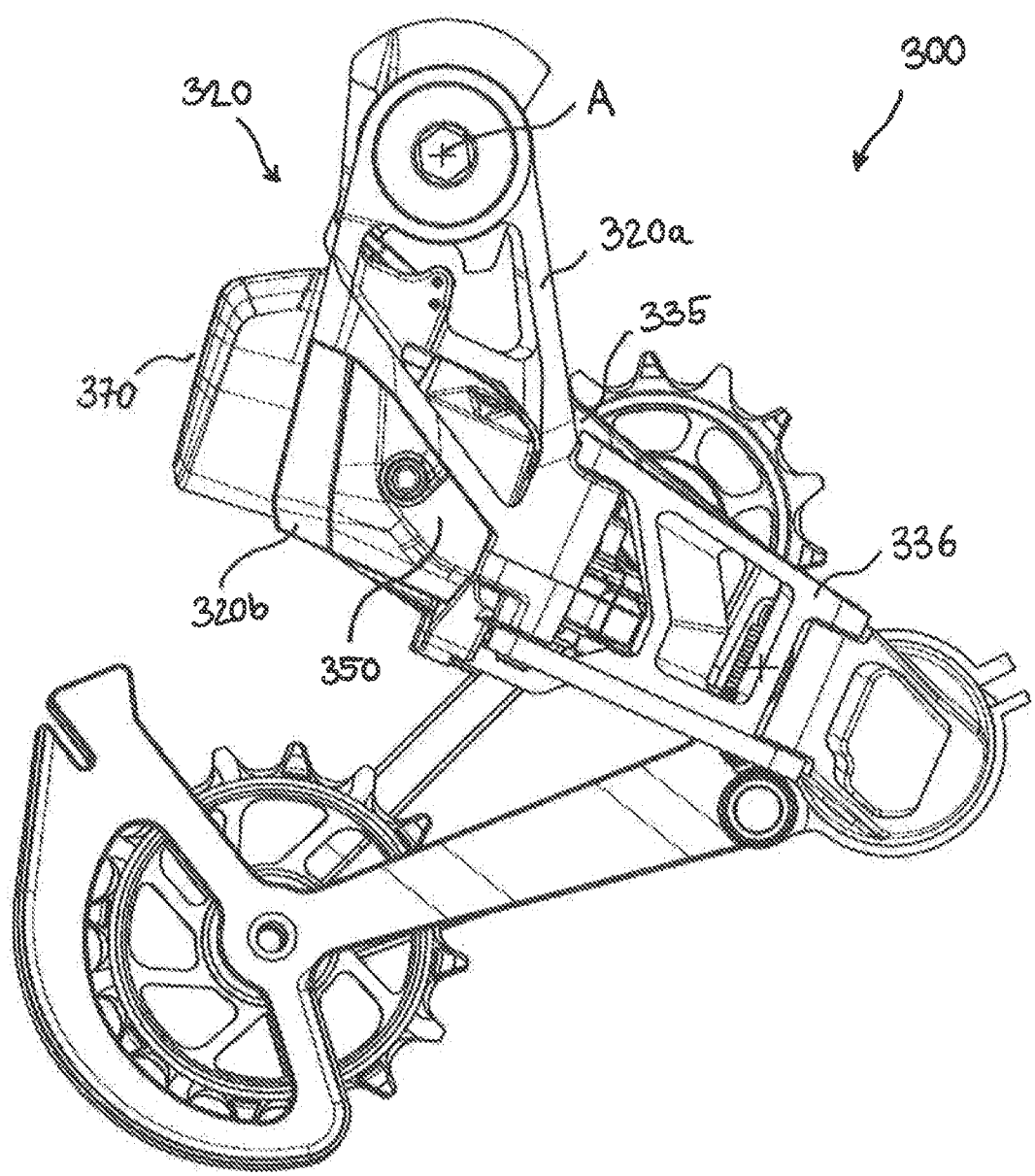
FIG. 13a is an exterior view of the electromechanical rear derailleur according to an embodiment.
Figure 13B:
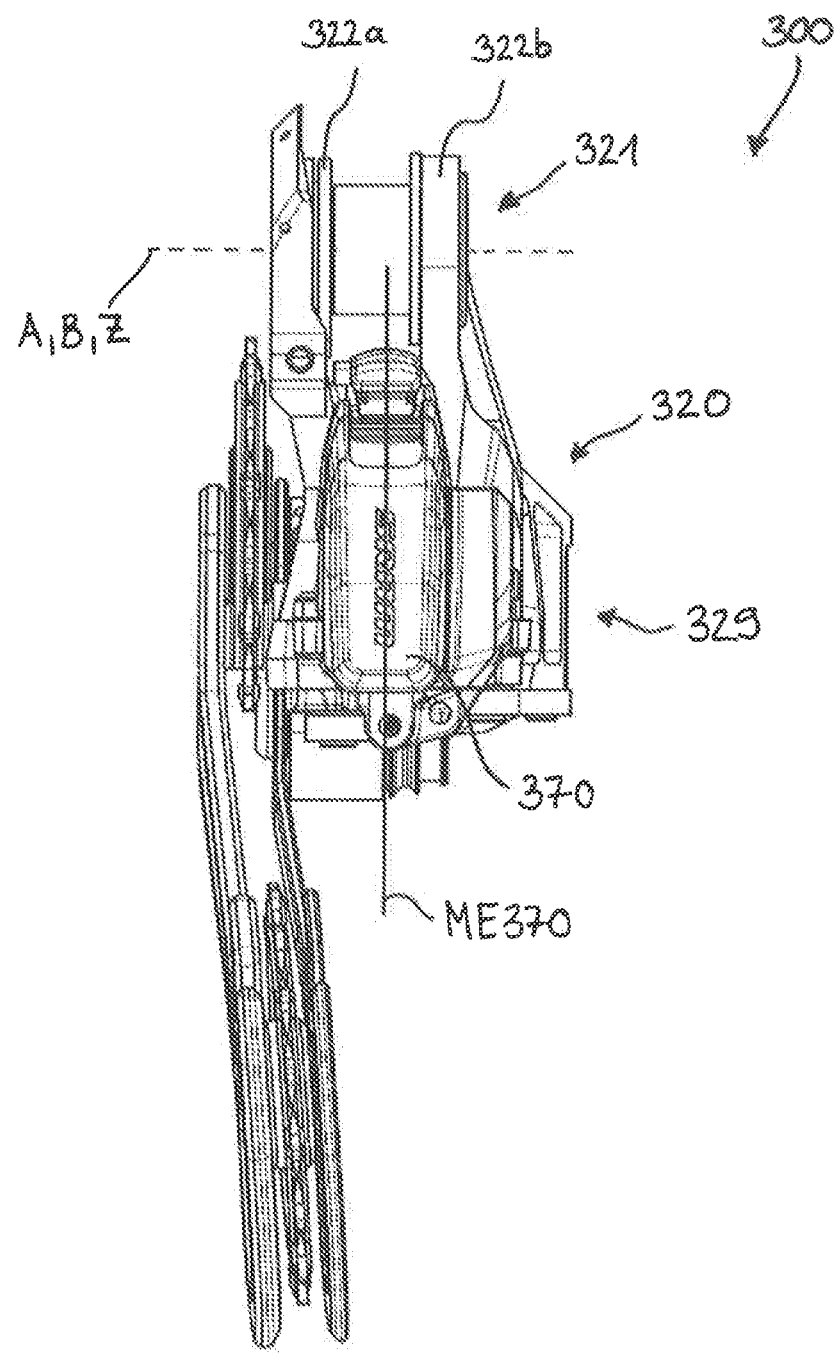
FIG. 13b is a rear view of the electromechanical derailleur according to an embodiment.

FIGS. 13a and 13b show the rear derailleur 300 from FIG. 12 not mounted on the frame, on the one hand in an exterior view and on the other hand in a rear view. As in the first embodiment, the base member 320 has at its first connection end 321 two arms 322a, 322b, through which, for mounting on the rear wheel axis A, there passes a bolt along the B-axis, or Z-axis. The base member 320 has at its second connection end 329 two pin receivers for the pivot pins 31, 32 for the rotatable mounting of the pivot arms 335, 336 of the pivot mechanism 330. The longitudinal axes L1, L2 of the pin receivers run substantially parallel to the sprocket planes, or intersect the rear wheel axis A at a right angle.

The base member 320 is in two-part form. The base member 320 comprises a first base sub-member 320a and a second base sub-member 320b. The first base sub-member 320a is configured for coaxial mounting on the rear wheel axis A. The second base sub-member 320b is configured for mounting on the first base sub-member 320a. The first and second base sub-members 320a, 320b are screwed together.

The first base sub-member 320a comprises the first connection end 321 having the two arms 322a, 322b and the two centring openings. The first base sub-member 320a also comprises the second connection end 329 having the two pin receivers for the first and second pivot pins 31, 32. The second base sub-member 320b can likewise have pin receivers for the pivot pins 31, 32. In this embodiment, the pivot pins 31, 32 pass through both the pin receivers of the first base sub-member 320a and the pin receivers of the second base sub-member 320b.

Regardless of whether the base member 320 is in one- or multi-part form, the position of the centring openings in the arms 322a, 322b at the first connection end 321 and the position of the pin receivers at the second connection end 329 are unchangeable relative to one another. The first connection end 321 can be mounted coaxially with the rear wheel axis A, and the second connection end 329 serves for coupling with the pivot mechanism. The Z-axis of the centring opening and the longitudinal axes L1, L2 of the pin receivers for the pivot pins 31, 32 are unchangeable relative to one another. They are configured rigidly relative to one another. There is no articulated link between a derailleur hanger, which is configured for mounting on the rear wheel axis A, and the base member (B-knuckle), which comprises the pin receivers for the pivot mechanism.

The housing cavity for receiving the gear housing 350 with the electromechanical drive is defined between the first and second base sub-members 320a, 320b. The two-part form of the base member 320 facilitates the insertion of the gear housing 350.

FIG. 13b is a rear view of the rear derailleur 300 of FIG. 13a. Here, the positioning of the power source 370 relative to the first and second arms 322a, 322b of the base member 320 is clear. In comparison to the embodiment in FIG. 2d, the battery 370 is arranged axially slightly further outwards. A notional midplane ME370 of the battery 370 is slightly offset outwards in the axial direction relative to a midplane, not shown here, of the dropout. Further, the midplane of the battery ME370 runs between the first arm 322a and the second arm 322b of the base member 320. In addition, the midplane of the power source ME370, in the state mounted on the bicycle frame 301, lies approximately in a plane with the right dropout 302 (see FIG. 12).

Figure 14:
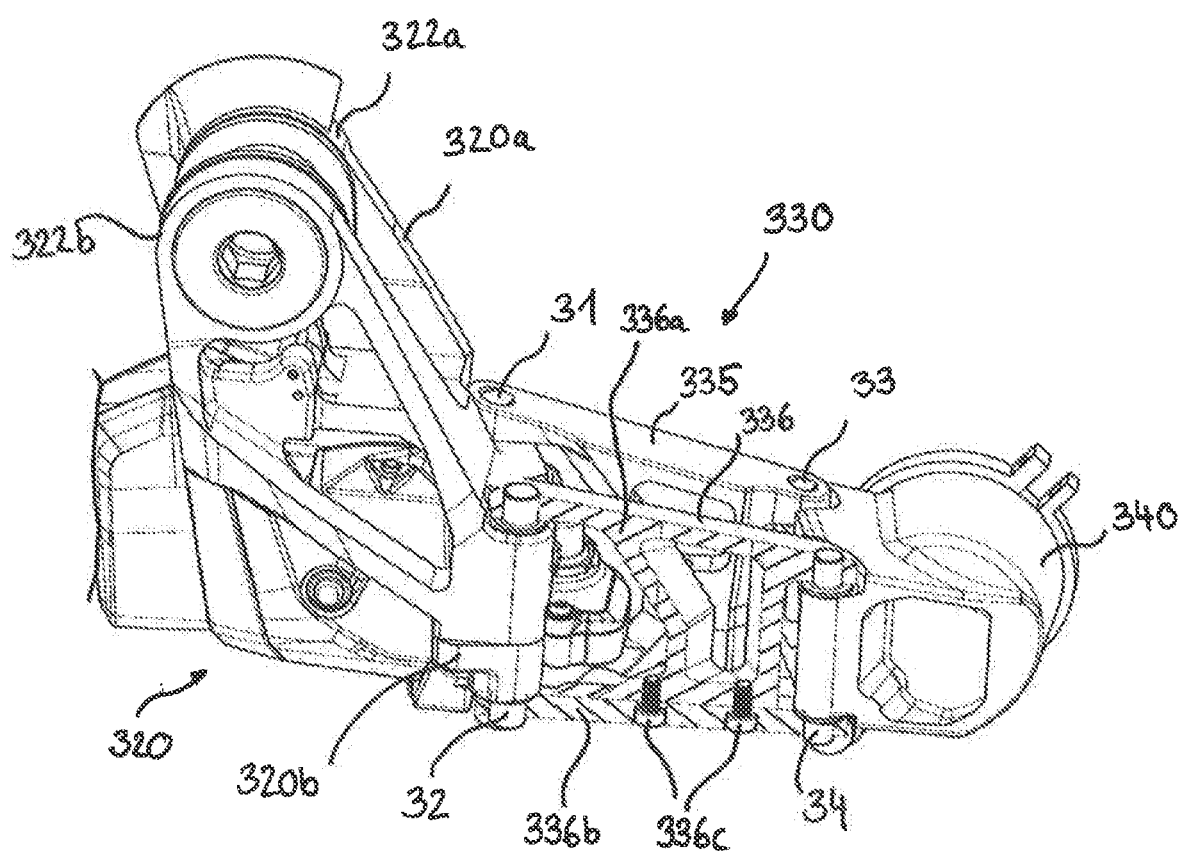
FIG. 14 is a perspective partial section through a sub-assembly of a rear derailleur according to an embodiment.
Figure 15:
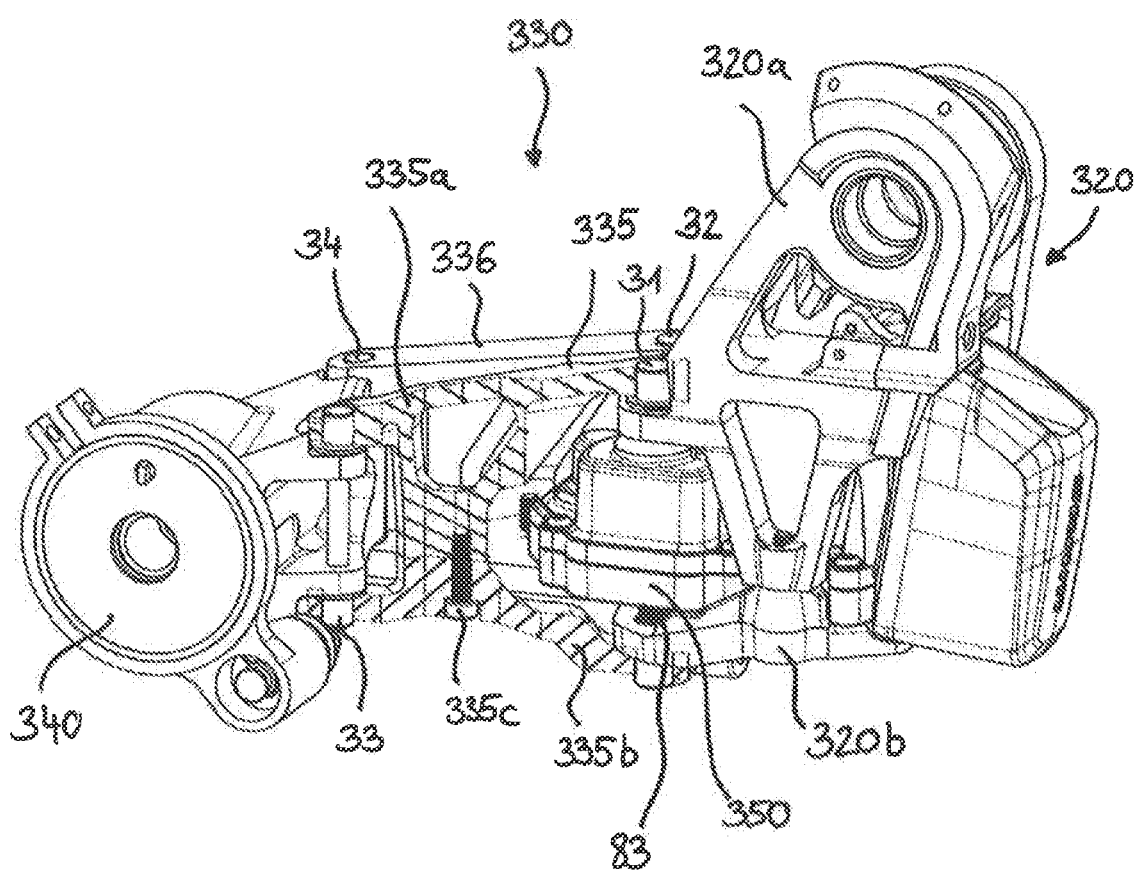
FIG. 15 is a perspective partial section through a sub-assembly of a rear derailleur according to an embodiment.

FIGS. 14 and 15 each show a perspective partial section through a sub-assembly (without the chain guiding arrangement) of a rear derailleur 300. The pivot mechanism 330 comprises an inner pivot arm 335 and an outer pivot arm 336. The inner pivot arm 335 is articulated with the base member 320 via a first pivot pin 31, and the outer pivot arm 336 is articulated with the base member 320 via a second pivot pin 32. For this purpose, the pivot pins 31, 32 pass through the pin receivers in the first and second base sub-members 320a, 320b.

In FIG. 14, the outer pivot arm 336 is shown partly cut away. The outer pivot arm 336 is in two-part form. The pivot arm 336 comprises a top first part 336a and a bottom second part 336b. The two parts 336a, 336b of the pivot arm 336 are releasably connected by two screws 336c. The second and the fourth pivot pins 32, 34 of the pivot mechanism 330 are mounted in the outer pivot arm 336. The pivot pins 32, 34 are each mounted with one end in the first part 336a and with the other end in the second part 336b of the outer pivot arm 336.

In FIG. 15, the inner pivot arm 335 is shown partly cut away. The pivot arm 335 is in two-part form. The pivot arm 335 comprises a top first part 335a and a bottom second part 335b. The two parts 335a, 335b of the inner pivot arm 335 are releasably connected by a screw 335c. The first and third pivot pins 31, 33 are mounted in the inner pivot arm 335. The pivot pins 31, 33 are each mounted with one end in the first part 335a and with their other end in the second part 335b of the pivot arm 335.

It is an advantage over a one-part form of the pivot arms that, because of the two-part form, the pivot pins no longer have to be pushed in from one side. Through-bores in the pivot arms are thus unnecessary. The first and second part of a pivot arm can be seated on the ends of the pivot pin. One-sided openings in the pivot arm, for example in the form of a blind hole or a cylinder liner which is closed on one side, are sufficient to receive the ends of the pivot pins. This facilitates assembly and reduces the penetration of dirt and moisture. It is apparent from FIG. 15 that the pivot pin 33 has a smaller diameter in the middle than at its ends. The pivot pin 33 is inserted with its ends in cylinder liners which are closed on one side, which close the through-bores in the pivot arm 335 on one side. Alternatively, the pivot arm could have blind holes in which the pivot pin is mounted.

The inner and/or outer pivot arm can be in one-part or multi-part form. Multi-part pivot arms can have two or more parts. The division can be made at different positions. The releasable connection of the parts can take place by one or more screws or comparable fasteners.

The pivot arms 335, 365 have recesses which prevent a collision with the gear housing 350 on pivoting of the pivot mechanism 330. The gear housing 350 projects, at least in the pivoted state of the pivot arms 335, 336, into a notional, vertically running midplane of the inner and/or outer pivot arm 335, 336. The explanations relating to the pivot arms are applicable equally to the following embodiments.

Figure 16:
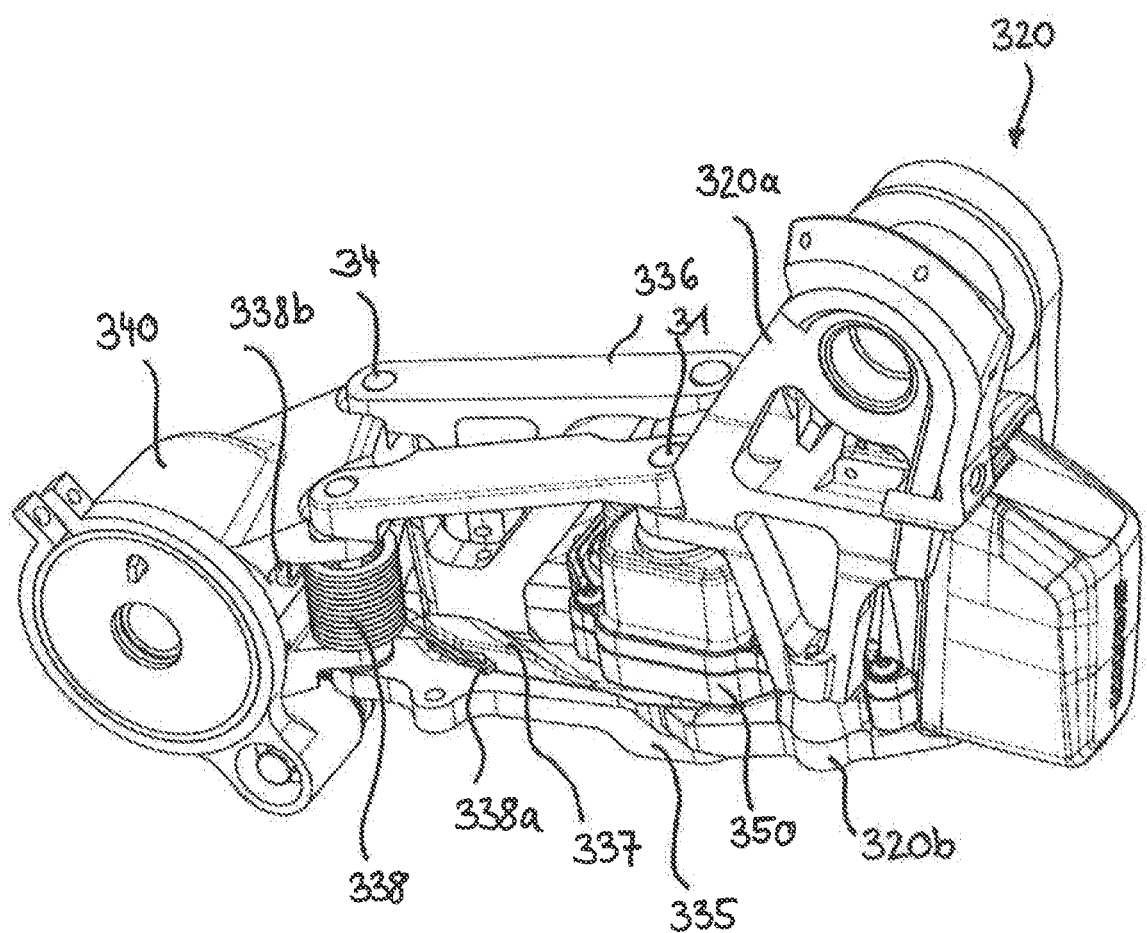
FIG. 16 is a perspective interior view of a sub-assembly of a rear derailleur with a drive arm according to an embodiment.

FIG. 16 is a perspective interior view of a sub-assembly of a rear derailleur 300. In comparison with FIG. 15, further parts are visible here. The rear derailleur 300 is biased inwards (towards the frame) by the spring 338. A first spring arm 338a is supported on the drive arm 337 and a second spring arm 338b is supported on the movable member 340. The drive arm 337 is connected in a torque-transmitting manner at one end to the output shaft 83 of the electromechanical drive in the gear housing 350 (see FIGS. 7 and 15). The output shaft 83 runs coaxially with the first pivot pin 31. The other end of the drive arm 337 lies against the inner side of the inner pivot arm 335. In a first shift direction, the drive arm 337 presses outwards against the inner pivot arm 335 and moves the pivot mechanism 330 outwards against the spring bias. The drive arm 337 is rotated outwards about the geometric axis L1 of the first pivot pin 31, and the chain is moved to a smaller sprocket. In a second, opposite shift direction, the drive arm 337 moves inwards away from the inner pivot arm 335, so that the pivot mechanism 330 moves inwards with the spring bias. The drive arm 337 is rotated inwards about the axis L1, and the chain is moved to a large sprocket.

Figure 17:
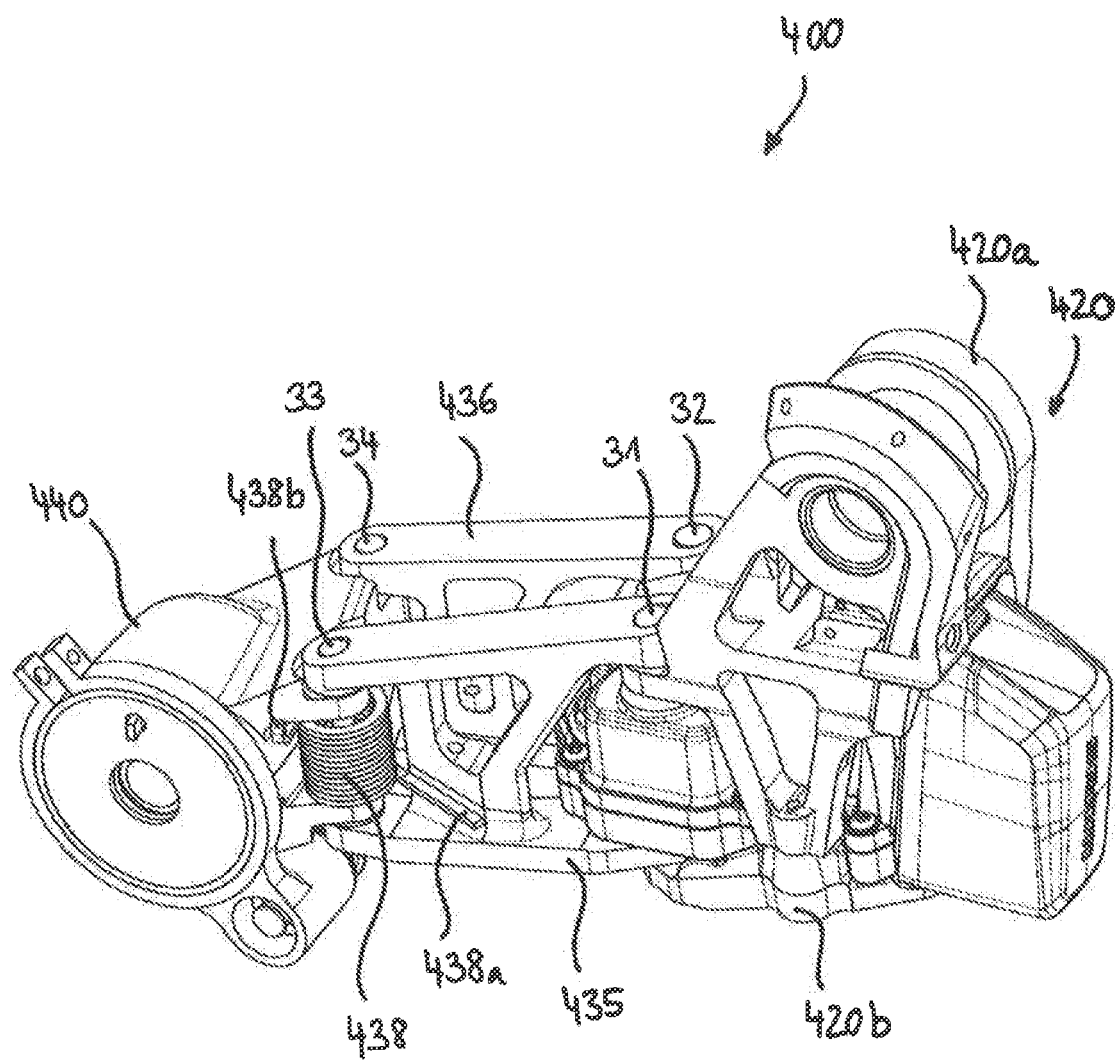
FIG. 17 is a perspective interior view of a sub-assembly of a rear derailleur of a fifth embodiment.

FIG. 17 is a perspective interior view of a sub-assembly of a rear derailleur 400 of the fifth embodiment. The rear derailleur 400 is likewise biased inwards by the spring 438. For this purpose, a first spring arm 438a is supported on the inner pivot arm 435, and a second spring arm 438b is supported on the movable member 440. Unlike in the preceding exemplary embodiment, an additional drive arm is not required here. The first spring arm 438a is supported directly on the inner pivot arm 435. The inner pivot arm 435 is connected directly in a torque-transmitting manner to the output shaft of the electromechanical drive. At the same time, the output shaft serves as a bottom pivot pin, which rotatably connects the inner pivot arm 435 to the bottom base sub-member 420b of the base member 420. For this purpose, the output shaft is rotatably mounted in the second pin receiver on the bottom base sub-member 420b. According to the shift direction, the inner pivot arm 435 is moved outwards against the spring bias or inwards with the spring bias.

Figure 18:
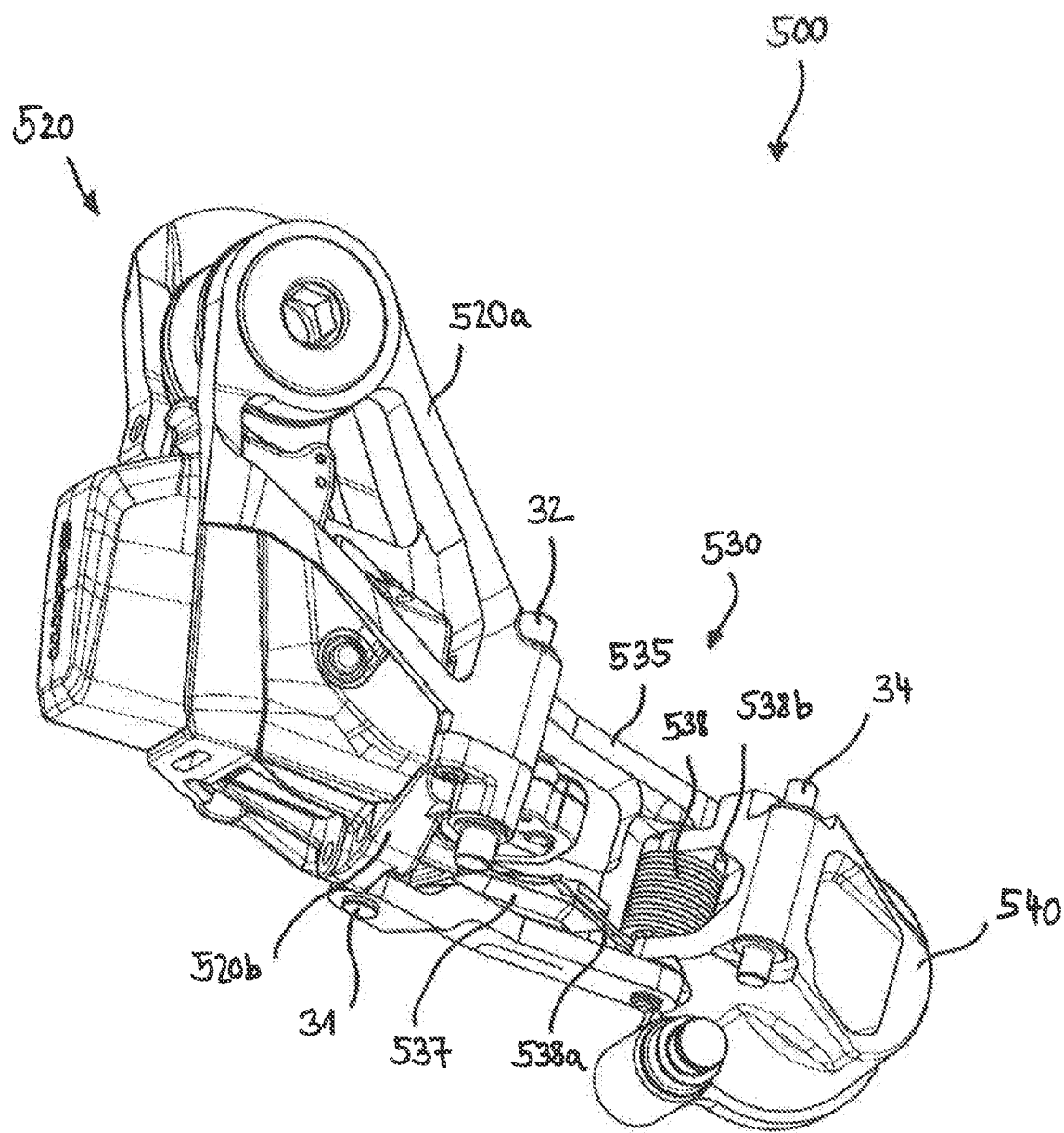
FIG. 18 is a perspective exterior view of a sub-assembly of a rear derailleur of a sixth embodiment.

FIG. 18 is a perspective exterior view of a sub-assembly of a rear derailleur 500 of the sixth embodiment. For the sake of clarity, the outer pivot arm is not shown. Unlike in the preceding exemplary embodiments, the rear derailleur 500 is biased outwards (away from the frame) by the spring 538. For this purpose, a first spring arm 538a is supported on the drive arm 537, and a second spring arm 538b is supported on the movable member 540. The drive arm 537 is connected at one end in a torque-transmitting manner to the output shaft of the electromechanical drive. The other end of the drive arm 537 lies against the outer side of the inner pivot arm 535. In a first shift direction, the drive arm 537 pushes inwards against the inner pivot arm 535 and moves the pivot mechanism 530 inwards against the spring bias. The drive arm 537 is rotated inwards about the pivot pin 31, and the chain is moved to a larger sprocket. In a second, opposite shift direction, the drive arm 537 moves outwards away from the inner pivot arm 535, so that the pivot mechanism 530 moves outwards with the spring bias. The drive arm 537 is rotated outwards about the pivot pin 31, and the chain is moved to a smaller sprocket.

Figure 19:
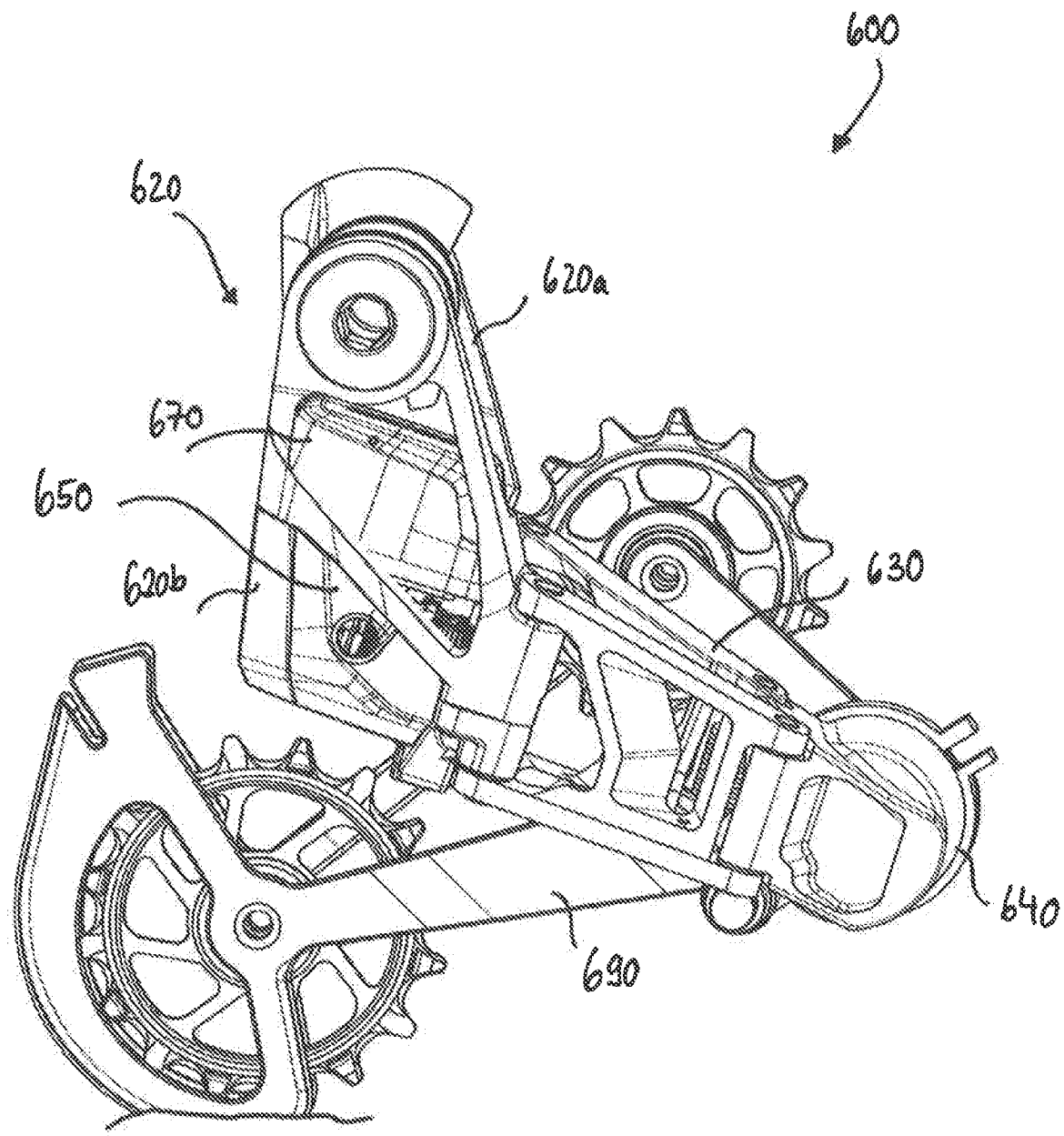
FIG. 19 is a perspective exterior view of an electromechanical rear derailleur of a seventh embodiment.

FIG. 19 is a perspective exterior view of an electromechanical rear derailleur 600 of the seventh embodiment, having a base member 620, a pivot mechanism 630, a movable member 640 and a chain guiding arrangement 690. Unlike in the preceding exemplary embodiments, the battery is here not arranged at the rear on the base member. The battery 670 is arranged inside the base member 620. The base member 620 defines a cavity which is large enough to receive the gear housing 650 and the power source 670. The base member 620 is in two-part form and consists of a first base sub-member 620a and a second base sub-member 620b. The battery 670 is releasably connected directly to the gear housing 650. The battery 670 can be attached to the top side of the gear housing 650, for example by latching. It is advantageous in this embodiment that the battery 670 is surrounded by the base member 620 and thus protected against external influences.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations and/or acts are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that any described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. An electromechanical rear derailleur for coaxial mounting on a rear wheel axis of a bicycle, comprising:
    a base member, the base member releasably mounted on a bicycle frame;
    a movable member;
    a chain guiding arrangement connected to the movable member for rotation about an axis of rotation;
    a pivot mechanism connecting the base member to the movable member such that the movable member is movable relative to the base member; and
    an electromechanical drive for driving the pivot mechanism,
    wherein the base member includes a first connection end and a second connection end, the first connection end for coaxial mounting on the rear wheel axis, and the second connection end for coupling with the pivot mechanism,
    a power source having a midplane, in the state mounted on the bicycle frame the midplane lies approximately in a plane with a right dropout,
    wherein the electromechanical drive is received in a gear housing, and the gear housing has an electrical interface to directly attach a power source to the gear housing.

2. The electromechanical rear derailleur of claim 1, wherein the first connection end of the base member is connected to the base member in a rotationally secure manner, and formed in one piece therewith.

3. The electromechanical rear derailleur of claim 2, wherein the first connection end has at least one arm with a centring opening.

4. The electromechanical rear derailleur of claim 2, wherein the first connection end of the base member has a first arm and a second arm arranged spaced apart from one another in the axial direction, the first arm has a first centring opening, and the second arm has a second centring opening.

5. The electromechanical rear derailleur of claim 4, wherein, in the mounted state, the first arm is located on an axial inner side of the bicycle frame and the second arm is located on an axial outer side of the bicycle frame.

6. The electromechanical rear derailleur of claim 1, wherein the second connection end of the base member has a first pin receiver for a first pivot pin of the pivot mechanism and a second pin receiver for a second pivot pin of the pivot mechanism.

7. The electromechanical rear derailleur of claim 6, wherein the first pin receiver and the second pin receiver are each oriented substantially orthogonally to the rear wheel axis.

8. The electromechanical rear derailleur according to claim 6, wherein the first and second pin receivers are each oriented at an angle relative to the rear wheel axis.

9. The electromechanical rear derailleur of claim 1, further comprising:
an adapter, wherein the adapter connects the base member to the bicycle frame, the adapter includes a screw connection, the screw connection being a bolt with an external thread and a nut with an internal thread.

10. The electromechanical rear derailleur of claim 1, wherein the electromechanical drive is arranged in a first region of the base member.

11. The electromechanical rear derailleur of claim 10, wherein the electromechanical drive is a worm gear, and a motor-operated worm thereof is arranged in part in the first region of the base member, and cooperates with a worm wheel on the pivot mechanism.

12. The electromechanical rear derailleur of claim 11, the base member defines a housing cavity in which the gear housing is arranged at least in part.

13. The electromechanical rear derailleur of claim 12, wherein the base member is in a multi-part form and includes at least a first base sub-member for mounting on a bicycle frame and a second base sub-member for mounting on the first base sub-member, and the housing cavity is defined between the first and second base sub-member.

14. The electromechanical rear derailleur of claim 13, wherein the first base sub-member comprises the first connection end of the base member having a first arm and a second arm.

15. An electromechanical rear derailleur for coaxial mounting on a rear wheel axis of a bicycle, comprising:
a base member, the base member releasably mounted on a bicycle frame and having a first connection end and a second connection end, the first connection end for coaxial mounting on the rear wheel axis;
a movable member;
a chain guiding arrangement connected to the movable member for rotation about an axis of rotation;
a pivot mechanism connecting the base member to the movable member such that the movable member is movable relative to the base member, the second connection end of the base member coupling with the pivot mechanism;
an electromechanical drive for driving the pivot mechanism; and
a power source having a midplane that runs between a first arm and a second arm of first connection end of the base member, and a midplane of the power source, in the state mounted on the bicycle frame, lies approximately in a plane with a right dropout.

16. An electromechanical rear derailleur for coaxial mounting on a rear wheel axis of a bicycle, comprising:
a base member, the base member releasably mounted on a bicycle frame;
a movable member;
a chain guiding arrangement connected to the movable member for rotation about an axis of rotation;
a pivot mechanism connecting the base member to the movable member such that the movable member is movable relative to the base member;
an electromechanical drive for driving the pivot mechanism; and
a power source having a midplane, in the state mounted on the bicycle frame the midplane lies approximately in a plane with a right dropout,
wherein the base member includes a first connection end and a second connection end, the first connection end for coaxial mounting on the rear wheel axis, and the second connection end for coupling with the pivot mechanism,
wherein the base member is configured to be fastened to the power source in a manner that electrically connects the power source to the electromechanical drive, and
wherein an electrical interface between the power source and the base member is positioned inboard of the base member.

* * * * *